US012616312B2

(12) United States Patent
Zeng et al.

(10) Patent No.: US 12,616,312 B2
(45) Date of Patent: May 5, 2026

(54) INFLATABLE PRODUCT, AND MANUFACTURING APPARATUS AND MANUFACTURING METHOD THEREFOR

(71) Applicant: BESTWAY INFLATABLES & MATERIAL CORP., Shanghai (CN)

(72) Inventors: Xianglin Zeng, Shanghai (CN); Yihua You, Shanghai (CN); Xiaguang Xu, Shanghai (CN); Bingrong Wu, Shanghai (CN); Jiabao Jiang, Dongguan (CN); Jing Wang, Dongguan (CN); Qingshui Song, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 18/203,881

(22) Filed: May 31, 2023

(65) Prior Publication Data

US 2024/0251960 A1 Aug. 1, 2024

(30) Foreign Application Priority Data

Feb. 1, 2023 (CN) .......................... 202310098091.6
Feb. 1, 2023 (CN) ........................ 202320172271.X

(51) Int. Cl.
*A47C 27/08* (2006.01)
*A47K 3/06* (2006.01)
(Continued)

(52) U.S. Cl.
CPC .............. *A47C 27/081* (2013.01); *A47K 3/06* (2013.01); *A61H 33/6005* (2013.01);
(Continued)

(58) Field of Classification Search
CPC ..... A47C 27/08; A47C 27/081; A47C 27/082; A47C 27/083; A47C 27/084;
(Continued)

(56) References Cited

U.S. PATENT DOCUMENTS 3,683,431 A * 8/1972 Pennel ................. A47C 27/087
5/712
7,694,372 B1 * 4/2010 Boyd ................... A47C 27/081
5/711
(Continued)

FOREIGN PATENT DOCUMENTS

CN 103538202 A 1/2014
CN 208798926 U 4/2019
(Continued)

OTHER PUBLICATIONS

Extended European Search Report dated Oct. 20, 2023 (Oct. 20, 2023), 7 pages, issued on related European Patent Application 23171515.2, by the European Patent Office.
(Continued)

*Primary Examiner* — George Sun
(74) *Attorney, Agent, or Firm* — Dickinson Wright PLLC

(57) ABSTRACT

An inflatable product is provided, including a first wall, a second wall, and a plurality of internal tensioning members connecting the first and second walls. Each internal tensioning member includes a first fixing strip and a second fixing strip respectively coupled to the first wall and the second wall. The inflatable product further includes a thread helically wound around the first fixing strip and the second fixing strip. First parts the thread are fixed between the first fixing strip and the first wall, and second parts of the thread are fixed between the second fixing strip and the second wall. An apparatus set and method for manufacturing the inflatable product are also provided.

11 Claims, 20 Drawing Sheets

(51) Int. Cl.

| | |
|---|---|
| *A61H 33/00* | (2006.01) |
| *B29D 22/02* | (2006.01) |
| *B63B 32/51* | (2020.01) |
| *E04H 4/00* | (2006.01) |

(52) U.S. Cl.
CPC .............. *B29D 22/02* (2013.01); *B63B 32/51* (2020.02); *E04H 4/0025* (2013.01); *A61H 2201/0103* (2013.01)

(58) Field of Classification Search
CPC ... A47C 27/085; A47C 27/086; A47C 27/087; A47C 27/088; A47C 27/10; A47C 27/18; B63B 32/51; A47K 3/06; A61H 33/6005; A61H 2201/0103; B29D 22/02; E04H 4/0025
See application file for complete search history.

(56) References Cited

U.S. PATENT DOCUMENTS

| | | | |
|---|---|---|---|
| 2002/0083528 A1 | 7/2002 | Fisher et al. | |
| 2008/0000029 A1* | 1/2008 | Feingold ................ | A47C 27/18 5/690 |
| 2010/0107333 A1* | 5/2010 | Ortlieb ................ | A47G 9/0207 428/221 |
| 2020/0187668 A1* | 6/2020 | Ocegueda Gallaga ...................... | B29C 66/1122 |
| 2022/0117405 A1* | 4/2022 | Huang ................... | B68G 15/00 |
| 2022/0304477 A1* | 9/2022 | Long .................... | A47C 31/105 |

FOREIGN PATENT DOCUMENTS

| | | |
|---|---|---|
| CN | 214983386 U | 12/2021 |
| CN | 114379126 A | 4/2022 |
| EP | 2674075 B1 | 5/2015 |
| WO | 2015023932 A1 | 2/2015 |

OTHER PUBLICATIONS

Extended European Search Report dated Mar. 21, 2022 (Mar. 21, 2022), 10 Pages, issued on related European Patent Application 21202440.0 by the European Patent Office.

Communication pursuant to Article 94(3) EPC (European Office Action) dated Feb. 20, 2025 (Feb. 20, 2025), 5 pages issued on related European Patent Application 21202440.0 by the European Patent Office.

Chinese Office Action dated Jun. 4, 2025 (Jun. 4, 2025), 14 pages with Machine Generated English Translation, Issued on related priority Chinese Patent Application 202011126174.4 by the China National Intellectual Property Administration.

* cited by examiner

200

500

125

122

50

52

60

62

INFLATABLE PRODUCT, AND MANUFACTURING APPARATUS AND MANUFACTURING METHOD THEREFOR

CROSS-REFERENCE TO RELATED APPLICATION

This application claims priority from Chinese Application CN202310098091.6 filed in China on Feb. 1, 2023 and Chinese Application CN202320172271.X, filed in China on Feb. 1, 2023, the disclosures of which are incorporated herein by reference in their entireties.

BACKGROUND

Field

Example embodiments relate to inflatable products, and in particular to an inflatable product including internal tensioning members, and a manufacturing apparatus and manufacturing method therefor.

Description of Related Art

With the development of materials technologies and increasing social demands, people increasingly use portable devices in various places, such as carrying the devices used indoors to the outdoors for use. As a typical example, inflatable products have been widely applied in the areas of recreation, entertainment, and sports because of their light weight and easy packaging and storage.

Thanks to internal structures, most inflatable products, after being inflated, achieve a preset final shape under the combined actions of internal air pressures and internal tensile forces. For example, tensioning members may be arranged in an inflatable chamber of an inflatable product, such that the tensioning members are connected to inner walls of the inflatable chamber enabling the inflatable product to assume a desired shape once inflated.

With an increase in the variety of inflatable products, some inflatable products need to have high air pressures in their inflatable chambers in order to meet the needs of use. Therefore, the connection between the tensioning members and the inner wall of the inflatable chamber should be highly reliable, and the tensioning member itself should also have a high tensile strength.

Inflatable products may be formed by splicing various material sheets by means of high-frequency welding, and accordingly, product surfaces and internal tensioning members are generally made of elastic sheet materials that can be subjected to welding, an often, to high-frequency welding. As a widely used material, Polyvinyl chloride (PVC) has been used in many inflatable products. However, for products with high internal air-pressures, due to a creep behavior of the material when the inflatable product is subjected to a high internal pressure (especially when an ambient temperature is high), sheet internal tensioning members made of the PVC material may deform, so that a contour of the inflatable product is deformed, affecting user experience. In addition, PVC degrades only slowly after the product is discarded, causing a pressure on the human environment.

FIG. 1 illustrates a related-art inflatable mattress. The inflatable mattress 10 includes a top wall 14, a bottom wall 16, a side wall 18, and a plurality of internal tensioning members 12 connecting the top wall 14 and the bottom wall 16. The top wall 14, the bottom wall 16, and the side wall 18, together, define an inflatable chamber, and the internal tensioning members 12 limit the shape of the inflatable mattress 10 after inflation, enabling a user to comfortably use the mattress. The top wall 14, the bottom wall 16, the side wall 18, and the plurality of internal tensioning members 12 may all be made of PVC that is easily deformed after long-term use and is likely to cause environmental pollution after being discarded.

Sometimes, a material having a laminated structure is used as an internal tensioning member. For example, a fabric layer may be arranged between two layers of PVC films, and all the layers are made into a laminated material by means of a lamination process. In this way, the creep behaviors of the internal tensioning members made of the laminated material are limited, thereby improving the deformation resistance capacity of the product. However, such materials are still subject to deformation to a certain extent after the product is inflated, and more PVC material is required, resulting in an increase of material costs. Furthermore, the use of more PVC material results in more environmental degradation pressure after product discarding.

A more environmentally friendly material is desired for use in internal tensioning members. A plurality of parallel threads or fabrics may be made into internal tensioning members to be fixedly connected to an inner wall of an inflatable product. For example, U.S. Pat. No. 3,683,431 and U.S. patent application Ser. No. 17/504,196 each disclose an internal tensioning member which is a tensioning member of an inflatable mattress that is made with a helical structure.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an inflatable product comprises: a first wall, a second wall opposite the first wall, and a plurality of internal tensioning members connecting the first wall and the second wall, each of the internal tensioning members comprising: a first fixing strip fixedly and directly coupled to the first wall; a second fixing strip fixedly and directly coupled to the second wall, the second fixing strip disposed in parallel to the first fixing strip; at least one thread extending helically around and along the first fixing strip and the second fixing strip, wherein first parts of the at least one thread are fixed between the first fixing strip and the first wall, and second parts of the at least one thread are fixed between the second fixing strip and the second wall.

The at least one thread may comprise a plurality of threads spaced apart from each other along a length of the first fixing strip and the second fixing strip.

The plurality of threads may be spaced apart from each other at a constant interval along the length of the first fixing strip and the second fixing strip.

Each of the first fixing strip, the second fixing strip, the first wall, and the second wall may be made from a weldable material.

Each of the first fixing strip, the second fixing strip, the first wall, and the second wall may be made from one of: polyvinyl chloride, thermoplastic polyurethane elastomer, polyethylene terephthalate, ethylene-vinyl acetate, polyurethane, and nylon.

The at least one thread may be made from one of: cotton fibers, linen fibers, silk fibers, nylon fibers, natural fibers, synthetic fibers, polyester, polypropylene, polyethylene, glass fibers, and carbon fibers.

The first fixing strip may be fixedly coupled to the first wall by means of high-frequency welding, and the second fixing strip may be fixedly coupled to the second wall by means of high-frequency welding.

At least one end of the at least one thread may be welded to one of the first fixing strip and second fixing strip.

Three-20 mm of the at least one thread may be welded to the one of the first fixing strip and the second fixing strip.

The first fixing strip may comprise a plurality of first fixing strips spaced apart from each other and arranged in parallel to and along the first wall, such that each of the plurality of first fixing strips is fixedly and directly coupled to the first wall, and wherein the at least one thread is helically wound around and along the plurality of first fixing strips.

The second fixing strip may comprise a plurality of second fixing strips spaced apart from each other and arranged in parallel to and along the second wall, such that each of the plurality of second fixing strips is fixedly and directly coupled to the second wall, and wherein the at least one thread is helically would around and along the plurality of first fixing strips and the plurality of second fixing strips.

According to an aspect of another example embodiment, an apparatus for manufacturing an inflatable product comprises: a tensioning member carrier comprising a base plate comprising an upper surface configured to hold a first fixing strip thereon, and a lower surface configured to hold a second fixing strip thereon; a winding apparatus comprising: a winding rack, a winding base plate movable along the winding rack, and a flywheel coupled to the winding base plate and comprising at least one thread roll, the flywheel being configured to rotate around the tensioning member carrier; and a high-frequency welding apparatus comprising a first welding plate and a second welding plate.

The tensioning member carrier may comprise a first adjustment plate disposed an adjustable distance from a first side of the base plate and a second adjustment plate disposed an adjustable distance from a second side of the base plate.

The tensioning member carrier may further comprise at least one hydraulic adjustment device configured to adjust the adjustable distance between the first adjustment plate and the first side of the base plate and the adjustable distance between the second adjustment plate and the second side of the base plate.

The winding apparatus may comprise two or four fixing strip grippers.

According to an aspect of another example embodiment, a method for manufacturing an inflatable product comprises: placing a first fixing strip on an upper surface of a tensioning member carrier and placing a second fixing strip on a lower surface of the tensioning member carrier; winding a thread around the tensioning member carrier such that the thread is uniformly wound around the tensioning member carrier; conveying a first sheet material and a second sheet material towards the tensioning member carrier, and welding the first fixing strip to the first sheet material and welding the second fixing strip to the second sheet material.

The first fixing strip may comprise a plurality of first fixing strips and the second fixing strip comprises a plurality of second fixing strips.

The winding the thread may comprise simultaneously winding a plurality of threads around the tensioning member carrier.

The simultaneously winding the plurality of threads may comprise simultaneously winding the plurality of threads at equal intervals to form a helix thereby.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
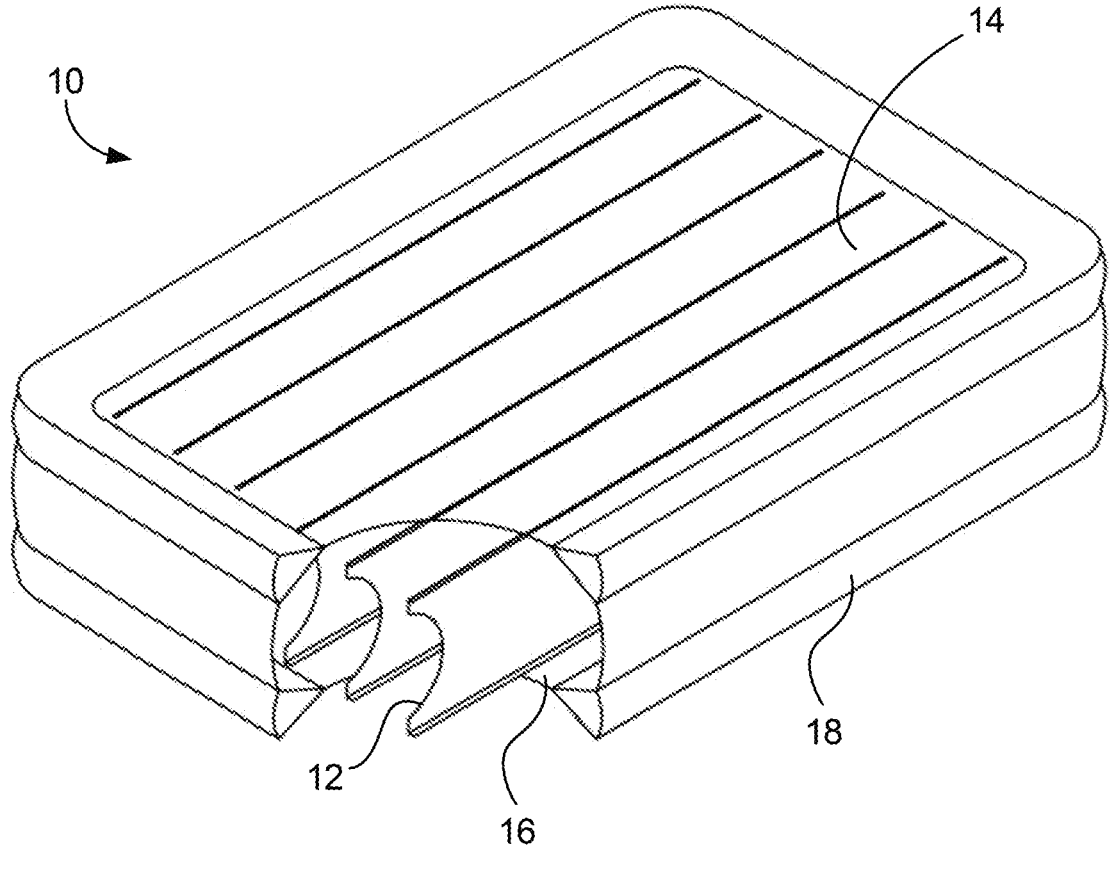
FIG. 1 is a schematic structural diagram of a related-art inflatable mattress.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/ or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

As used herein, it should be understood that orientation or position relationships indicated by terms such as "center," "longitudinal," "transverse," "length," "width,", "thickness," "up," "down," "front," "rear," "left," "right," "vertical," "horizontal," "top," "bottom," "inside," "outside," "clockwise," and "anticlockwise," are based on orientation or position relationships shown in the accompanying drawings and are merely for ease of description of the present application and simplification of the description, rather than indicating or implying that the devices or elements referred to must have a specific orientation or be constructed and operated in a specific orientation, and therefore cannot be construed as limiting.

In the present application, unless otherwise explicitly specified and defined, terms "mounting," "connecting," "connection," and "fixing" should be understood in a broad sense, for example, they can be a fixed connection, a detachable connection, or an integrated connection, and can be a direct connection and can also be an indirect connection through an intermediate. For those of ordinary skill in the art, the specific meaning of the terms mentioned herein should be construed according to specific circumstances.

As used herein, an "inflatable product" includes at least one inflatable chamber for inflation, and after the pressure of a gas (e.g., air) in the inflatable chamber reaches a desired value, the inflatable product is in an inflated state, and is maintained in a certain shape; and after the gas in the inflatable chamber of the inflatable product is discharged, the inflatable product is in a deflated state, and the volume of the inflatable product is greatly reduced relative to that of the inflatable product in the inflated state, thereby facilitating storage of the inflatable product.

One or more tensioning members are arranged in the inflatable chamber of the inflatable product, and each of at least two ends of each tensioning member are connected to a wall of the inflatable chamber. When tensioned, the tensioning member provides a tensile force to limit deformation of the wall of the inflatable chamber, allowing the inflatable product to maintain a certain shape after being inflated.

Figure 2:
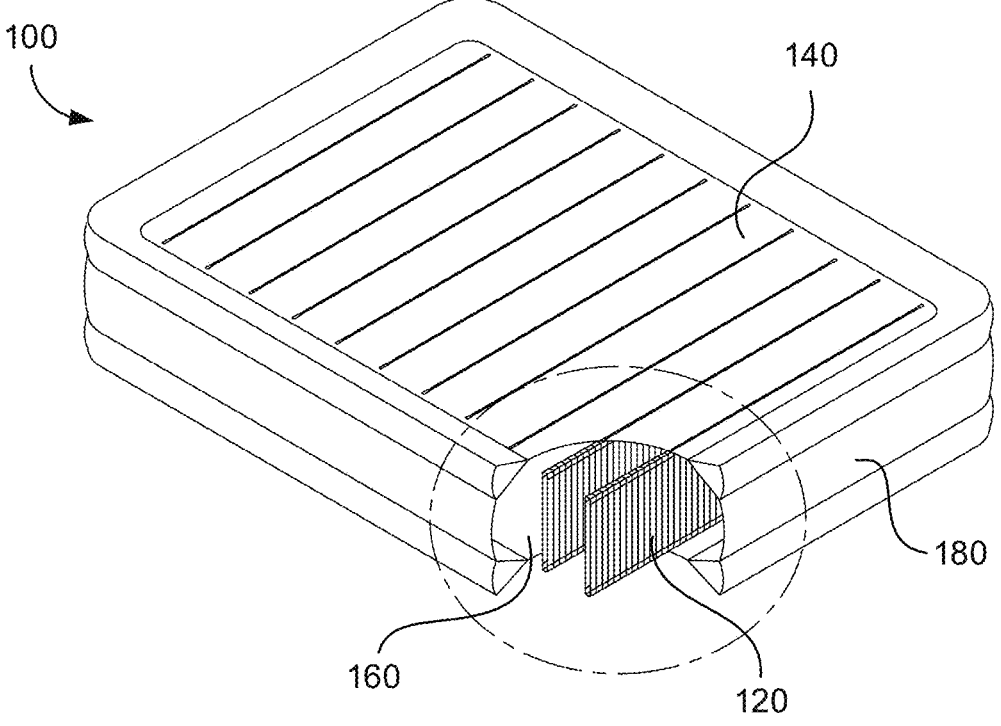
FIG. 2 is a schematic structural diagram of an inflatable mattress according to an example embodiment.
Figure 3:
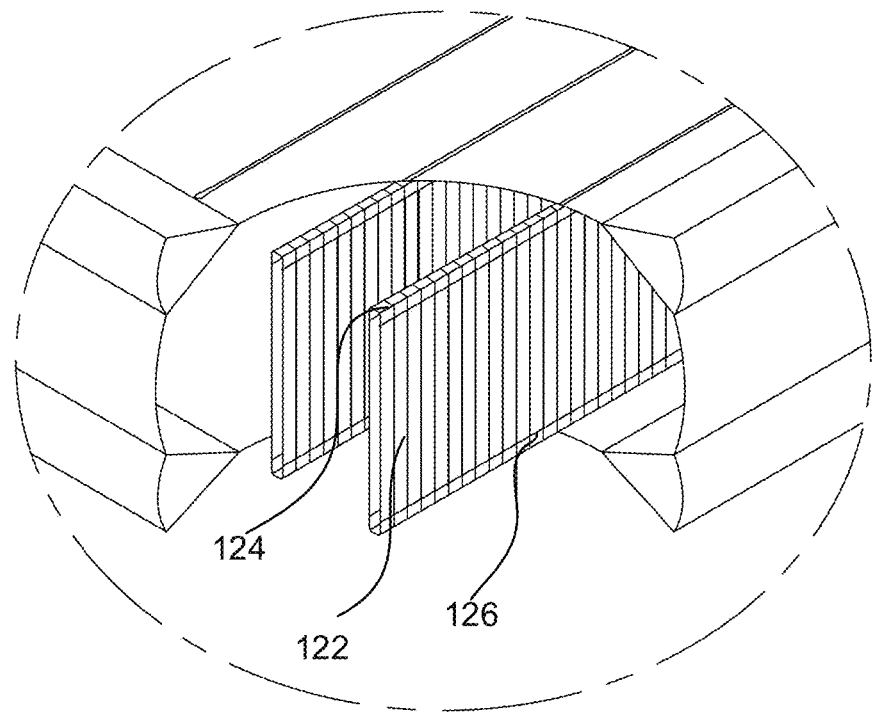
FIG. 3 is a partial enlarged view of a structure of the mattress shown in FIG. 2.

FIGS. 2 and 3 show a schematic structure of an inflatable mattress according to an example embodiment. The inflatable mattress 100 includes a top wall 140, a bottom wall 160, a side wall 180, and internal tensioning members 120 for connecting two opposing walls, e.g. the top wall 140 and the bottom wall 160. The top wall 140, the bottom wall 160, and the side wall 180, together, define therein an inflatable chamber of the inflatable mattress. The internal tensioning member 120 includes a fixing strip 124, which may be a single fixing strip 124 directly and fixedly connected to the top wall 140, a fixing strip 126, which may be a single fixing strip 126 directly and fixedly connected to the bottom wall 160, and one or more threads 122 connecting the fixing strips 124 and 126. After the inflatable mattress 100 is inflated, the portions of the one or more threads 122 disposed between the fixing strips 124 and 126 extend parallel, or substantially parallel, to each other. For example, the threads may be equally spaced or regularly spaced from each other, spanning a distance between the top wall and the bottom wall, and may remain in a tensioned state while the structure is inflated. A plurality of internal tensioning members 120 are arranged in parallel in the inflatable mattress so as to aid in the formation of the predetermined shape of the inflatable mattress. In the example shown, the fixing strips extend along the width of the inflatable mattress and the threads are spaced apart from each other along the width direction, though this is merely an example, and any of a variety of other arrangements are possible, as would be understood by one of skill in the art.

It can be understood that the internal tensioning members in FIGS. 2 and 3 are also applicable to any of a variety of other inflatable products, such as a bed, a ball, a cushion, a camping pad, or the like.

Figure 4A:
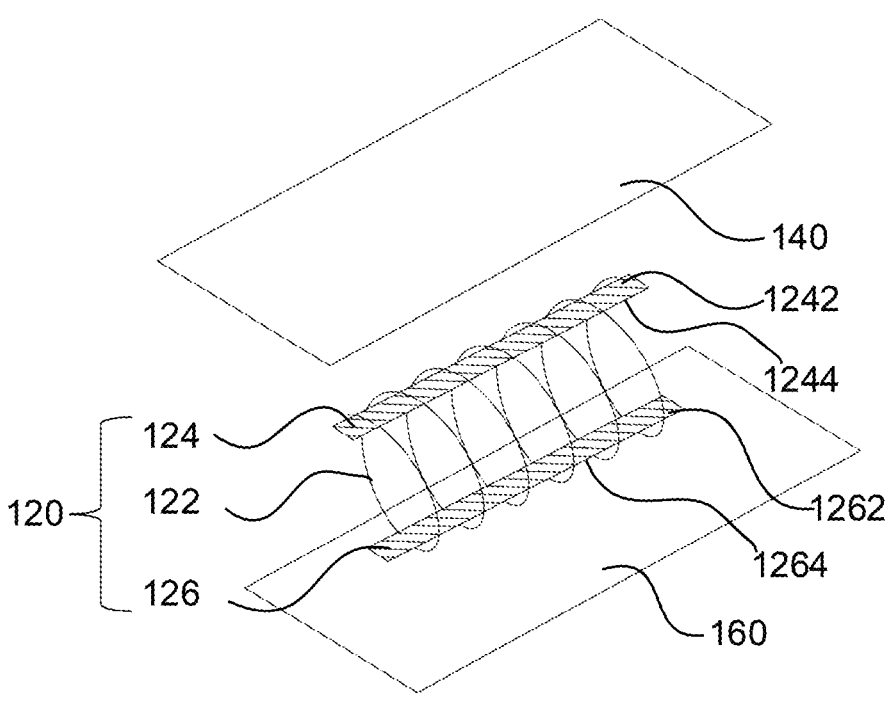
FIG. 4*a* is a schematic structure of an internal tensioning member of an inflatable product according to an example embodiment.

FIG. 4a shows a structural relationship between the tensioning member 120 and the opposing walls, here the top wall 140 and the bottom wall 160 according to a first example embodiment. A thread 122 is wound in a spiral or helical manner around the fixing strip 124 and the fixing strip 126. The thread 122 may be a single thread or multiple threads which are wound together around the fixing strips.

The fixing strip 124 and the fixing strip 126 are parallel, in the example shown, and vertically spaced apart from each other. The fixing strip 124 is directly and fixedly connected to the top wall 140. The fixing strip 126 is directly and fixedly connected to the bottom wall 160. Thus, there is no need for any additional layer between the thread wound around and along the fixing strip and the respective wall. There is also no need for any additional layer between the fixing strip and the respective wall. A single fixing strip may be used for each wall. By fixing the fixing strips directly to the respective walls, the thread becomes affixed between the fixing strip and the respective wall. In this way, the threads 122 bear a tensile force between the two opposing walls, here the top wall 140 and the bottom wall 160 after inflation, thereby aiding in maintaining the shape of the inflatable product after inflation. For instance, the fixing strip 124 includes an upper surface 1242 and a lower surface 1244. The fixing strip 126 includes an upper surface 1262 and a lower surface 1264. The upper surface 1242 of the fixing strip 124 is fixedly connected to the top wall 140. The lower surface 1264 of the fixing strip 126 is fixedly connected to the bottom wall 160. The thread is wound on top of the upper surface 1242 of the fixing strip 124 and below the lower surface 1264 of the fixing strip 126. The thread 122 is in contact with the upper surface 1242 of the fixing strip 124 and the lower surface 1264 of the fixing strip 126.

In this example embodiment, for ease of description, the fixing strips 124 and 126 are made from a polyvinyl chloride (PVC) material, the top wall 140 and the bottom wall 160 are also made from the PVC material, and the fixing strips 124 and 126 are fixedly connected to the top wall 140 and the bottom wall 160 by means of e.g., high-frequency welding. Alternately, any other welding method can be used. The thread 122 may be made from a polyester material. It can be understood that the fixing strips 124 and 126 and the top wall 140 and the bottom wall 160 may be made from a material that may be welded, for instance a PVC material, and may alternately be made from a thermoplastic polyurethane elastomer (TPU), polyethylene terephthalate (PET), ethylene-vinyl acetate (EVA), polyurethane (PU) or nylon material, or any other elastic material suitable for manufacturing inflatable products. The elements welded to each other may be formed from the same material. Optionally, one or more of the fixing strips 124, the fixing strip 126, the top wall 140, and bottom wall 160 may further have an attachment layer or interlayer capable of enhancing the tensile resistance property thereof, and the attachment layer or interlayer may include, for example, threads, fibers, and/or a mesh structure. The thread 122 may be made of a windable tensile-resistant material, such as cotton fibers, linen fibers, silk fibers, nylon fibers, natural fibers, synthetic fibers, polyester, polypropylene, polyethylene, glass fibers, carbon fibers, etc. It can be understood that although the tensioning member 120 in the illustrated example embodiment is a single thread 122, in other embodiments, the tensioning member 120 may alternately be a plurality of threads 122 wound around the fixing strips 124 and 126 in a mutually spaced manner. The fixing strips 124 and 126, the top wall 140, and the bottom wall 160 may be glued, welded, or fixedly connected by any other reliable means. If more than one thread is used, the spacing between windings of a first thread may be different than the spacing of the winding of a second thread.

Figure 4B:
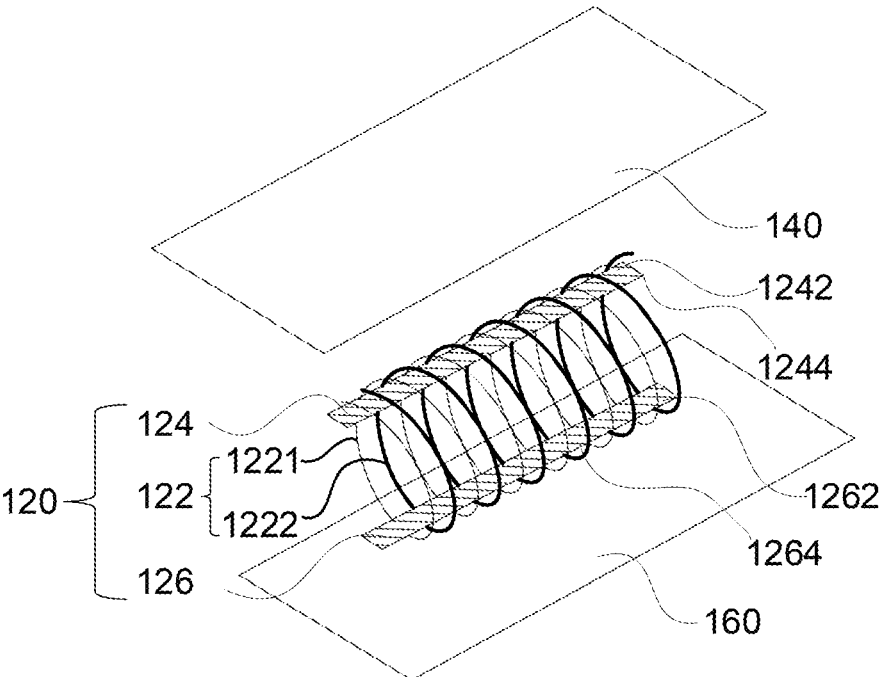
FIG. 4*b* is a schematic structure of an internal tensioning member of an inflatable product with threads of different thickness used simultaneously.

FIG. 4b differs from FIG. 4a in that threads of different material characteristics are used at the same time. For instance, a first thread 1221 may have a smaller diameter than a second thread 1222. Alternately, the first thread 1221 and the second thread 1222 may be formed from different materials. For example, the first thread 1221 may withstand a smaller tensile force than the second thread 1222. The first thread 1221 may be helically or spirally wound around the fixing strips 124, 126 with shorter intervals than the second thread 1222. This may allow adaptations to certain load requirements. Higher load values may be achieved with less thread. While the weaker thread may be disrupted due to a certain load applied, the stronger thread may maintain a certain shape of the product such that it does not become completely unusable.

Figure 4C:
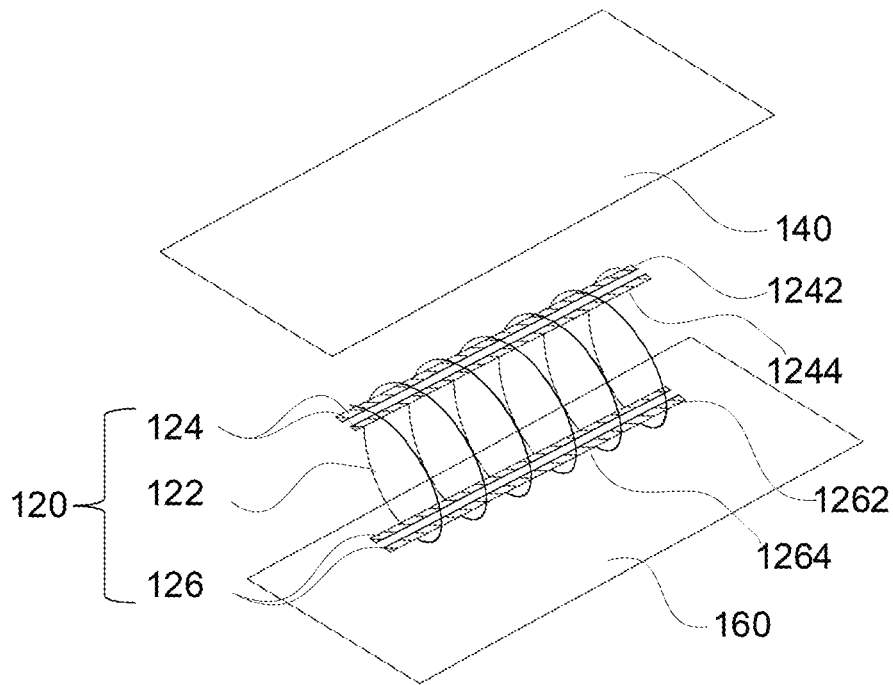
FIG. 4*c* shows a schematic structure of an internal tensioning member of an inflatable product with two upper and two lower fixing strips.

Each of the fixing strips may comprise a number of parallel strips, e.g. two strips spaced horizontally apart such that with a same material amount, a larger area is covered by the tensioning member. The thread would then not only extend between the two upper fixing members 124 and the two lower fixing members 126, but also between two upper fixing members 124, between a first upper fixing member 1242 and a second upper fixing member 1244 and/or between two lower fixing members 126, a first lower fixing member 1262 and a second lower fixing member 1264. This is shown in FIG. 4c. The thread 122 is wound around two upper fixing strips 124, which are horizontally spaced apart from each other, and two lower fixing strips 126.

FIGS. 5 to 14 show a plurality of manufacturing apparatuses and methods for manufacturing a product corresponding to one or more example embodiments.

Figure 5:
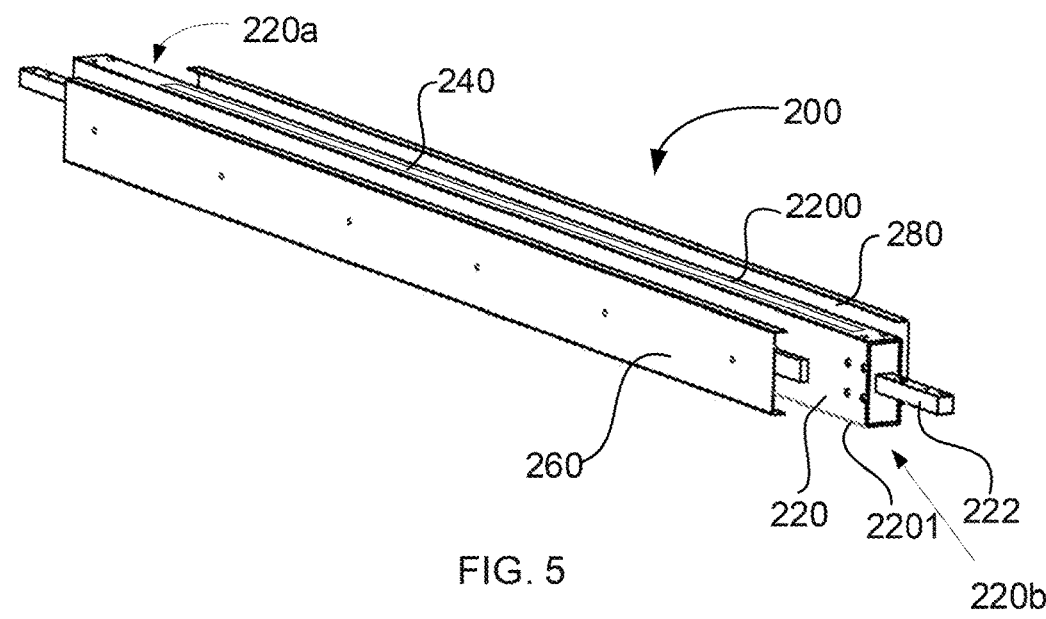
FIG. 5 of an internal tensioning member of an inflatable product a perspective structure of a tensioning member carrier according to an example embodiment.
Figure 6:
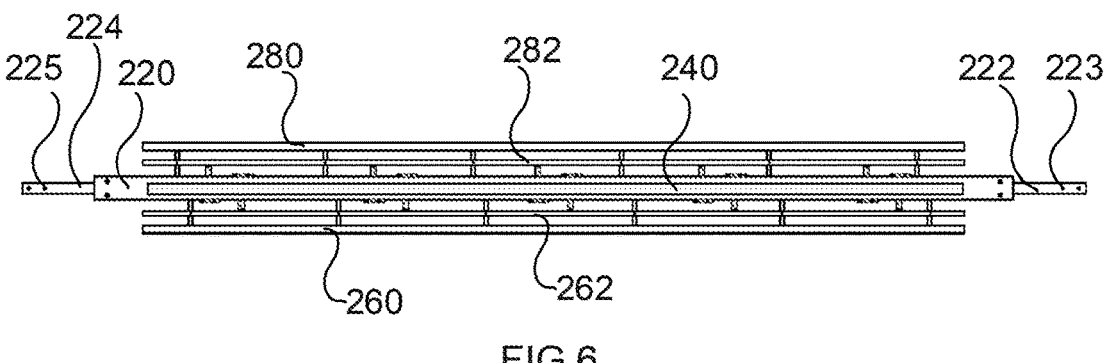
FIG. 6 is a top view of the tensioning member carrier shown in FIG. 5.

FIGS. 5 and 6 show a structure of an example tensioning member carrier 200. The tensioning member carrier 200 is used to carry a component or assembly bearing the tensioning member 120 to one or more apparatus rooms for processing. In this example embodiment, the tensioning member carrier 200 includes a base plate 220. The base plate 220 is a cuboid, including an upper surface 220a and a lower surface 220b. The upper and lower surfaces 220a and 220b may be both planar and smooth. The base plate 220 may be made of an aluminum material but is not limited thereto. The upper surface 220a and the lower surface 220b of the base plate 220 may each be fixedly attached to a welding plate 240. The welding plate 240 may be made of a copper material but is not limited thereto. It can be understood that the welding plate 240 may alternately be made of aluminum or any of a variety of other materials used for high-frequency welding.

A front end surface of the base plate 220 is connected to a front adjustment plate 260 via a front distance adjustment device 262. A rear end surface of the base plate 220 is connected to a rear adjustment plate 280 via a rear distance adjustment device 282. The front distance adjustment device 262 and the rear distance adjustment device 282 may each be a hydraulic adjustment device. When an internal pressure of a liquid (e.g., hydraulic oil) in a hydraulic cylinder of one of the hydraulic adjustment devices, the corresponding distance adjustment device pushes the corresponding adjustment plate away from the base plate 220. When a pressure in the hydraulic cylinder drops, the corresponding adjustment plate moves towards the base plate 220. It can be understood that the distance between the front adjustment plate 260 and the base plate 220 and the distance between the rear adjustment plate 280 and the base plate 220 may be adjusted by any one of a variety of alternate means, such as distance adjustment screws or lead screws, known to those skilled in the art.

A right end surface of the base plate 220 is provided with a support rod 222. A left end surface of the base plate 220 is provided with a support rod 224. The support rod 222 and the support rod 224 are each provided with oil holes 223 and 225. The oil holes 223 and 225 are in communication with the insides of the distance adjustment device 262 and the rear distance adjustment device 282, respectively. In production, a technician pressurizes or depressurizes the hydraulic oil through the oil holes 223 and 225 to adjust the distances of the front adjustment plate 260 and the rear adjustment plate 280 relative to the base plate 220. That is to say, by pressurizing or depressurizing the hydraulic oil through the oil holes 223 and 225, a circumference of a cross section of the tensioning member carrier 200 is adjusted, and the length of a portion of the thread 122 located between two welding plates 240 is thereby adjusted. Thereby, a distance between the top wall 140 and the bottom wall 160 of the inflatable mattress is changed. The length of the thread 122 located between two welding plates 240 may be in a range of 20-650 mm but may vary within and outside this range, depending on the product type.

Figure 7:
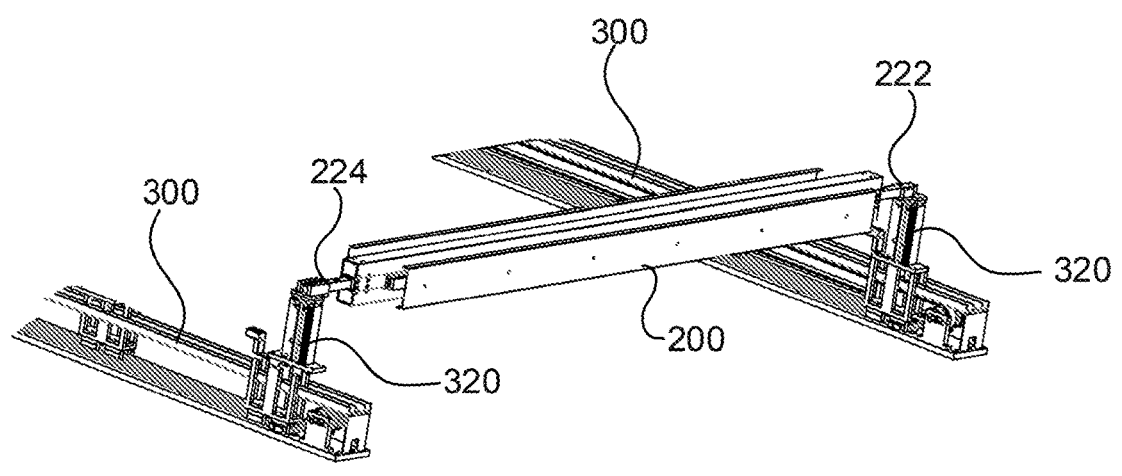
FIG. 7 of an internal tensioning member of an inflatable product a sliding track motion manner of a tensioning member carrier according to an example embodiment.

FIG. 7 shows an example movement manner of the tensioning member carrier 200. Two parallel tracks 300 are arranged parallel to the ground. For example, the parallel tracks 300 may be arranged on the ground. Two support rods 320 are capable of moving horizontally along the tracks 300 and capable of telescoping up and down. In this way, when supporting the support rod 222 and the support rod 224, the two support rods 320 can move with the support rod 222 and the support rod 224 in a horizontal direction and a vertical direction according to predetermined settings, thereby feeding the tensioning member carrier 200 into appropriate positions of the different manufacturing apparatuses.

For ease of explanation, the tracks 300 and the support rods 320 will be omitted in the following figures. It can be understood that the tracks 300 are arranged between process apparatuses, and the support rods 320 may always support the tensioning member carrier 200, or may be retracted downward after the tensioning member carrier 200 is fed into a predetermined position, so as to place the tensioning member carrier 200 on a support structure of another apparatus.

It can be understood that the tensioning member carrier 200 may also move to or in various apparatuses in other suitable manners. For example, the tensioning member carrier 200 may be carried in a suspended manner, in this case, a sliding track and a suspension rod may be arranged above the apparatus to grab the support rod 222 and the support rod 224 and move the tensioning member carrier 200.

Figure 8:
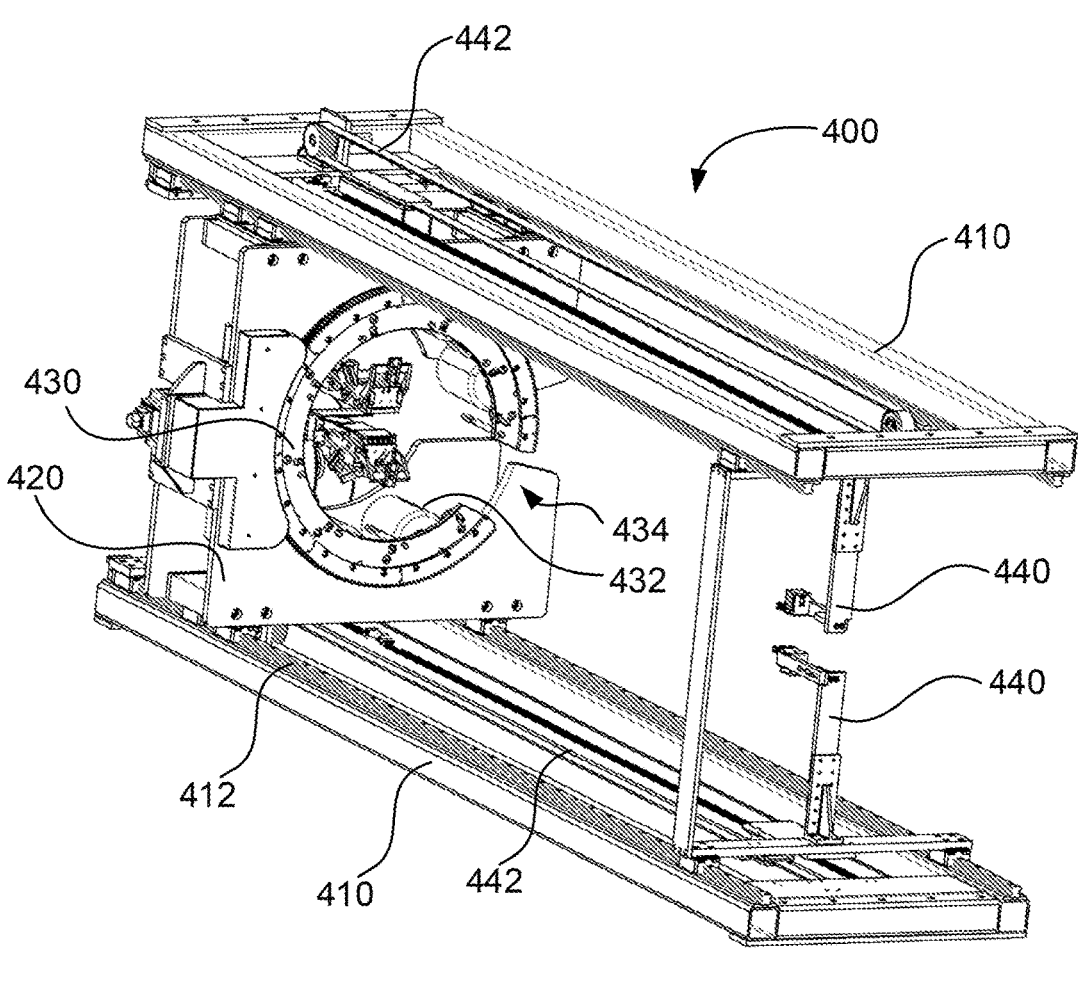
FIG. 8 is a schematic structure of a winding apparatus according to an example embodiment.
Figure 9:
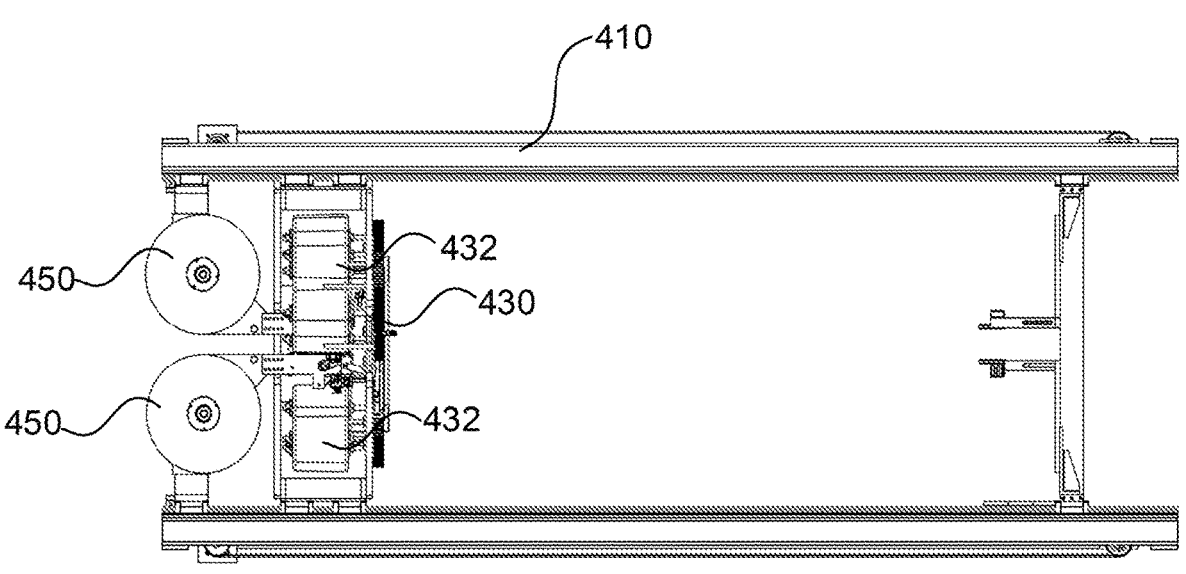
FIG. 9 is a front view of the winding apparatus shown in FIG. 8.

FIGS. 8 and 9 show an example structure of a winding apparatus 400. In this example embodiment, the winding apparatus 400 includes a winding rack 410. A track 412 is arranged in the winding rack 410, and may be disposed at the bottom of the winding rack 410. A winding base plate 420 is arranged on the track 412. The winding base plate 420 moves along the track 412 in one direction, which may be a horizontal direction. A hollow rotatable flywheel 430 is arranged coupled to the base plate 420, optionally, at a middle position of the base plate 420. One or more thread rolls 432 are rotatably and fixedly connected to the flywheel 430. As the flywheel 430 rotates, the one or more thread rolls 432 orbit the rotation axis of the flywheel 430 and rotate to provide the thread 122 for the manufacture of the tensioning member 120. The flywheel 430 is generally circular with a gap 434 at an edge thereof. The gap 434 may provide a passage for the tensioning member carrier 200 to enter a gap or hollow position of the flywheel 430 by means of a track.

One end portion of the winding base plate 420 is provided with a plurality of fixing strip rolls 450, e.g., two fixing strip rolls 450. Side surfaces, optionally, an upper surface and a lower surface of the winding rack 410 are each provided with a conveying device 442. A fixing strip gripper 440 is arranged on each of the two conveying devices 442. The fixing strip gripper 440 moves to the fixing strip roll 450 along the conveying device 442 to grip the fixing strip, so as to manufacture the tensioning member 120.

Figure 10:
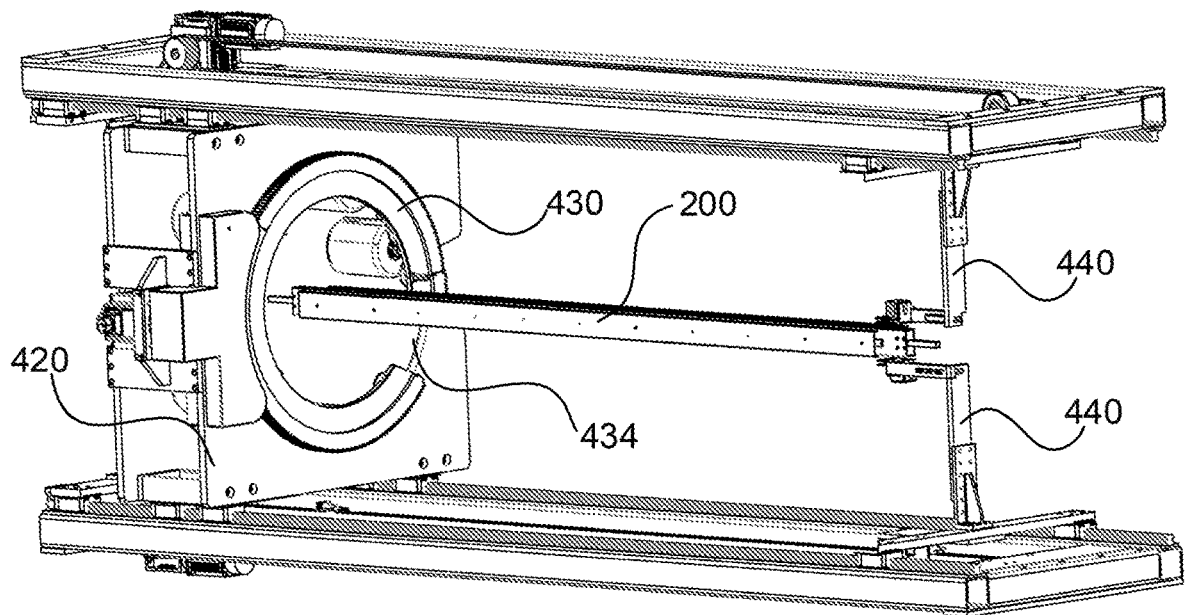
FIG. 10 is a schematic diagram of the winding apparatus shown in FIG. 8, in which a tensioning member carrier is arranged in the winding apparatus.

FIG. 10 shows an initial position of the winding apparatus 400 for winding the tensioning member carrier 200. The flywheel 430 rotates to an appropriate position such that the gap 434 is at the same level as the center of the flywheel 430 when the flywheel 430 is in a stopped state. The tensioning member carrier 200 moves into a central position of the flywheel 430 by means of the tracks 300 through the gap 434, and the longitudinal direction of the tensioning member carrier 200 is parallel or substantially parallel to the rotation axis of the flywheel 430. The two fixing strip grippers 440 respectively move to the positions of the two fixing strip rolls 450, and grip the fixing strips to the other end, so that the fixing strips 124 and 126 are respectively placed at the positions of the two welding plates 240 of the base plate 220.

Figure 11A:
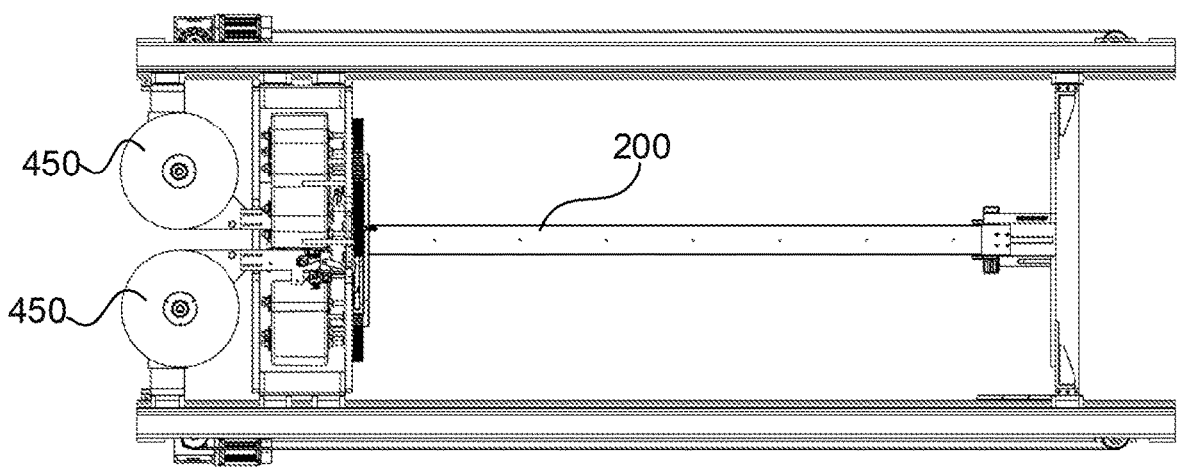
FIGS. 11*a*, 11*b* and 11*c* are schematic operation diagrams of the winding apparatus shown in FIG. 8.
Figure 11B:
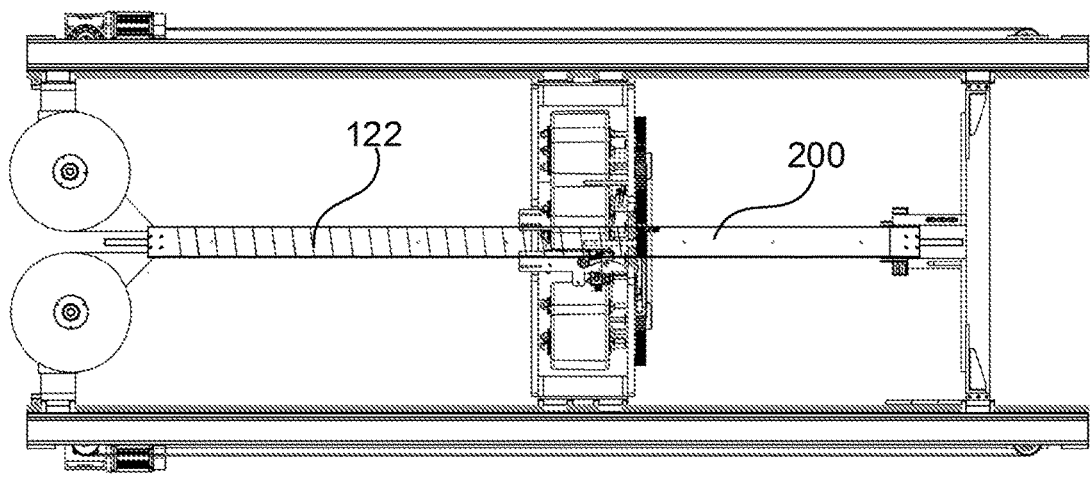
Figure 11C:
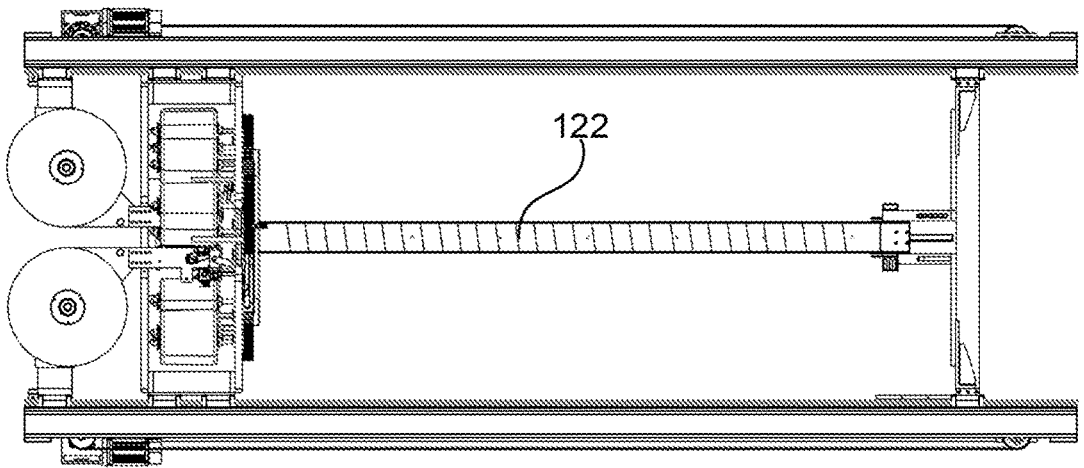

FIGS. 11*a*, 11*b* and 11*c* show a process of winding around the tensioning member carrier 200 by the winding apparatus 400. A thread end of one or more thread rolls 432 is wound around the tensioning member carrier 200 through a guide groove (not shown) in the flywheel 430. The winding base plate 420 moves to the right along the track 412 while the flywheel 430 rotates as well, and each thread roll 432 is freely rotated due to a tensile force of the corresponding thread end, so that the thread 122 is wound around the tensioning member carrier 200 at a certain pressure. The movement of each of the winding base plate and the flywheel may be at a constant speed. In this example embodiment, a plurality of thread rolls 432 are arranged on the flywheel 430. Compared with a case in which only one thread roll 432 is arranged, multiple (e.g., but not limited to five, six, seven, or eight) thread rolls 432 may allow more threads 122 to be wound around the tensioning member carrier 200 after the flywheel 430 rotates by one circle, thereby significantly improving the efficiency of producing the tensioning member 120. Optionally, the winding base plate 420 may move back slightly to the left after traveling to the rightmost position, allowing more threads 122 to be wound around the tensioning member carrier 200 within the range that the winding base plate 420 moves back, so as to prevent possible loosening of the thread ends which might from uneven tension of the threads at the end-positions of the winding of the helically arranged threads. Subsequently, the two fixing strip grippers 440 cut the fixing strips 124 and 126 to respectively disconnect the fixing strips 124 and 126 from the corresponding fixing strip rolls 450. The one or more threads 122 are cut off from the one or more thread rolls 432 before or after the fixing strips 124 and 126 are disconnected from the fixing strip rolls 450, or at the same time at which the fixing strips 124 and 126 are disconnected from the fixing strip rolls 450. In one example embodiment, the threads and strips are cut off simultaneously by individual cutters to improve the production efficiency, while they are cut off in sequence in alternate example embodiment to optimize the arrangement of moving parts of the machine. One or more cutters can be provided.

According to one or more example embodiments, considering that the inflatable product may have an irregular shape, or that the pressure exerted by the gas on the inner wall of the inflatable product may be unevenly distributed, different portions of each tensioning member 120 may be subjected to different tensile forces. In this case, it is possible to wind the thread 122 more densely at portions of the tensioning member 120 which may be subjected to a larger tensile force, so as to increase the tensile capacity of the portion. In this example embodiment, the flywheel 430 rotates at a constant speed while the winding base plate 420 moves at a variable speed along the track 412, thereby changing the winding density of the thread 122 on the tensioning member carrier 200. It can be understood that the density of winding the thread 122 around the tensioning member carrier 200 is not limited to being adjusted in this manner, but may be adjusted in any of a variety of other manners. For example, in other example embodiments, the winding base plate 420 may move at a constant speed along the track 412 while the flywheel 430 rotates at a variable speed; alternatively, the winding base plate 420 may move at a variable speed along the track 412 while the flywheel 430 also rotates at a variable speed. In other words, the density of the windings of the thread 122 around the tensioning member carrier 200 can be adjusted by adjusting the movement speed of the winding base plate 420 along the track 412 and/or the rotation speed of the flywheel 430, thereby adjusting the distribution density of the thread 122 in the tensioning member 120 such that different portions of the tensioning member 120 have different tensile capacities. E.g., surfboards may require a more stable middle portion for fins or sails.

The above-described tensioning member carrier 200 is wound with at least one spirally or helically arranged thread or in other words a group of spirally or helically arranged threads, which includes one or more threads 122. It can be understood that the tensioning member carrier 200 may optionally be wound with at least two different groups of helically arranged threads, which each include one or more threads 122, and are arranged sequentially either in the longitudinal direction of the fixing strip 124 or in the longitudinal direction of the fixing strip 126. The at least two groups of helically arranged threads positioned sequentially may be separated from each other, may be connected end-to-end, or may be partially overlapping. In other words, at least two groups of helically arranged threads are wound around a group of fixing strips, where the at least two groups of helically arranged threads are sequentially arranged in a longitudinal direction of at least one in the group of fixing strips, and the group of fixing strips (e.g., the fixing strips 124 and 126) is used to manufacture the same internal tensioning member 120. It can similarly be understood that the arrangement described herein, namely, at least two groups of helically arranged threads being wound around the same group of fixing strips, may also be applied to other example embodiments.

Figure 12:
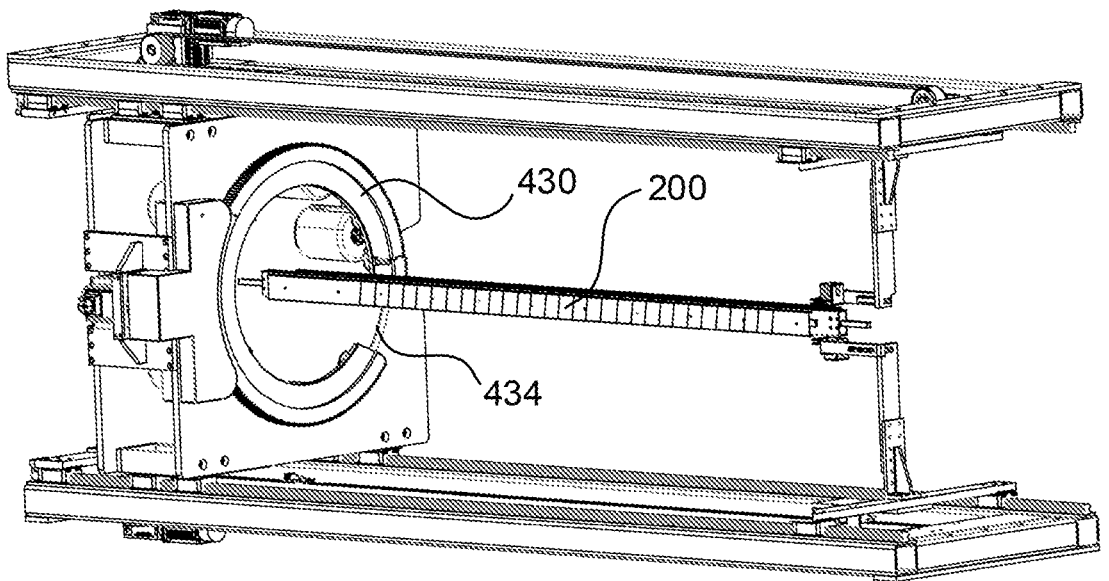
FIG. 12 is a schematic diagram of the winding apparatus shown in FIG. 8, in which the tensioning member carrier has completed a winding process.

FIG. 12 shows a structure of the winding apparatus 400 after the winding around the tensioning member carrier 200 is completed. In this case, the winding process of the internal tensioning member 120 is completed. The fixing strips 124 and 126 are laid flatly on the tensioning member carrier 200, and the thread 122 is wound around the tensioning member carrier 200 in a uniform manner with a constant spacing, while the thread parts in contact with the fixing strips, the thread ends at two ends each bear a certain tensile force and are thus less likely to be detached. The flywheel 430 rotates to an appropriate position such that the gap 434 is at the same level as the center of the flywheel 430 when the flywheel 430 is in the stopped state. The tensioning member carrier 200 moves out from the winding apparatus 400 by means of the tracks 300 through the gap 434.

Figure 13:
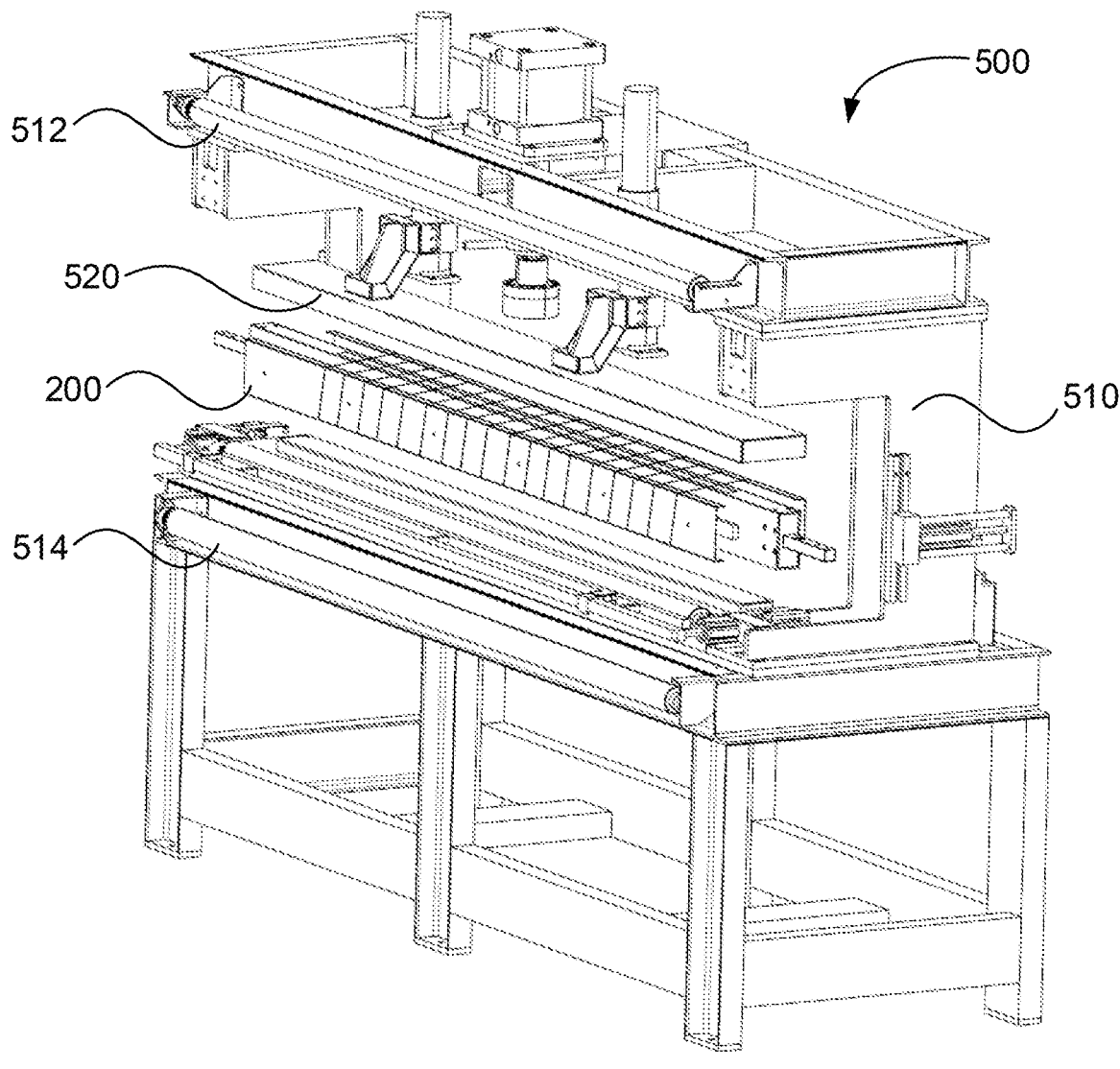
FIG. 13 is a schematic structure of a high-frequency welding apparatus according to an example embodiment.

FIG. 13 shows a schematic structure of a welding apparatus 500, which may, optionally, be a high-frequency welding apparatus 500 in which the tensioning member carrier 200 wound with the thread 122 is placed at a position for welding by means of the tracks 300. The high-frequency welding apparatus 500 includes a welding rack 510. The welding rack 510 is provided with a welding plate 520 above an upper portion where the tensioning member carrier 200 is arranged. The welding rack 510 is also provided with a welding plate 520 (not shown) made of an aluminum material and disposed below the lower portion where the tensioning member carrier 200 is arranged. It can be understood that the welding plate 240 may also be made of copper or any of a variety of other materials used for high-frequency welding. The welding rack 510 is further provided with an upper roller 512 and a lower roller 514 for tensioning and continuously conveying sheet material for the top wall 140 and the bottom wall 160.

Figure 14:
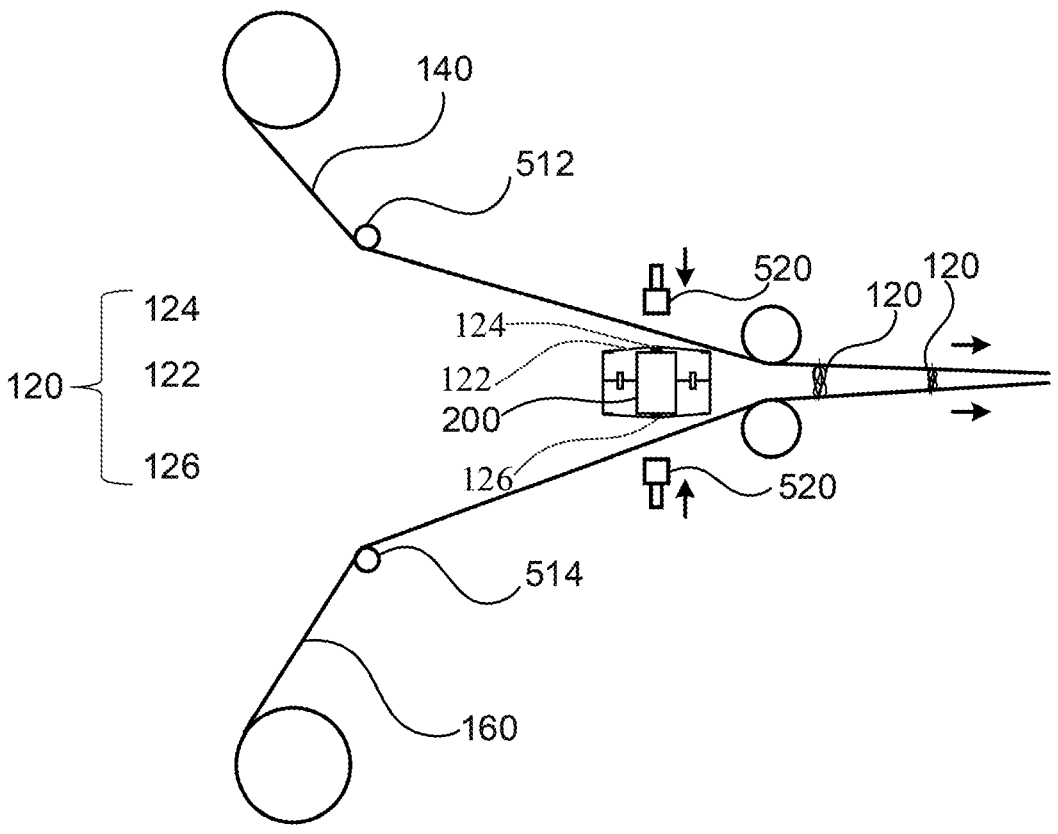
FIG. 14 is a schematic diagram showing an operating principle of the high-frequency welding apparatus shown in FIG. 13.

FIG. 14 shows a schematic process of a welding apparatus 500, which may, optionally, be the high-frequency welding apparatus 500 for welding the tensioning member 120 to the top wall 140 and the bottom wall 160 of the inflatable mattress 100. The tensioning member carrier 200 wound with the thread 122 is arranged at the position for welding of the high-frequency welding apparatus 500. The top wall 140 and the bottom wall 160 are arranged in a rolled-up manner on the left side of the high-frequency welding apparatus 500, and are spatially parallel to the longitudinal direction of the tensioning member carrier 200. The upper roller 512 and the lower roller 514 (and other rollers similar in function) respectively tension the sheet materials of the top wall 140 and the bottom wall 160, and enable the sheet material to be placed at a suitable angle for welding.

The two welding plates 520 respectively move toward the tensioning member carrier 200 to be in contact with the fixing strips 124 and 126 arranged at the upper and lower surfaces of the tensioning member carrier 200. A high-frequency voltage is set between the welding plates 520 and the welding plate 240 on the tensioning member carrier 200 by a power supply, so that the fixing strips 124 and 126 are respectively welded to the sheet materials of the top wall 140 and the bottom wall 160.

After the welding is completed, the two welding plates 520 respectively move away from the tensioning member carrier 200. The oil pressure is lowered through the oil holes 223 and 225 in the tensioning member carrier 200, so that the front adjustment plate 260 and the rear adjustment plate 280 on the tensioning member carrier 200 move toward the base plate 220. In this way, the thread of the tensioning member 120 becomes loose, and the tensioning member carrier 200 is then pulled out from the helically arranged thread of the tensioning member 120 in the longitudinal direction of the base plate 220.

Subsequently, the tensioning member carrier 200 moves to the winding apparatus 400 by means of the tracks 300 to perform the winding process again. A drawing apparatus (not shown) on the right side of the high-frequency welding apparatus 500 draws the sheet materials of the top wall 140 and the bottom wall 160 to the right by a preset distance, so that the high-frequency welding apparatus 500 is ready for the next welding process. It can be readily understood that the preset distance is the final distance between the two internal tensioning members 120 of the inflatable mattress. At this point, the high-frequency welding process of one internal tensioning member 120 is completed.

It can be readily understood that the welded internal tensioning members 120 are continuously obtained on the sheet materials of the top wall 140 and the bottom wall 160, and after a predetermined number of internal tensioning members 120 desired for the inflatable mattress is reached, the processed sheet materials are cut according to a predetermined size in a subsequent process and then welded to a sheet material of the side wall 180 to form a complete inflatable mattress.

As described with respect to the above example embodiments, it is possible to use only two fixing strips are used for one tensioning member 120, and the remaining material is thread, which reduces the weight of the inflatable mattress, reduces the consumption of material, which may be PVC material, and reduces the environmental burden regarding degradation. In addition, the helically arranged threads are tensioned on two sides of the fixing strip 124 and the fixing strip 126, so that the two sides of the fixing strips are uniformly stressed, increasing the internal tensile strength of the inflatable mattress.

Figure 15:
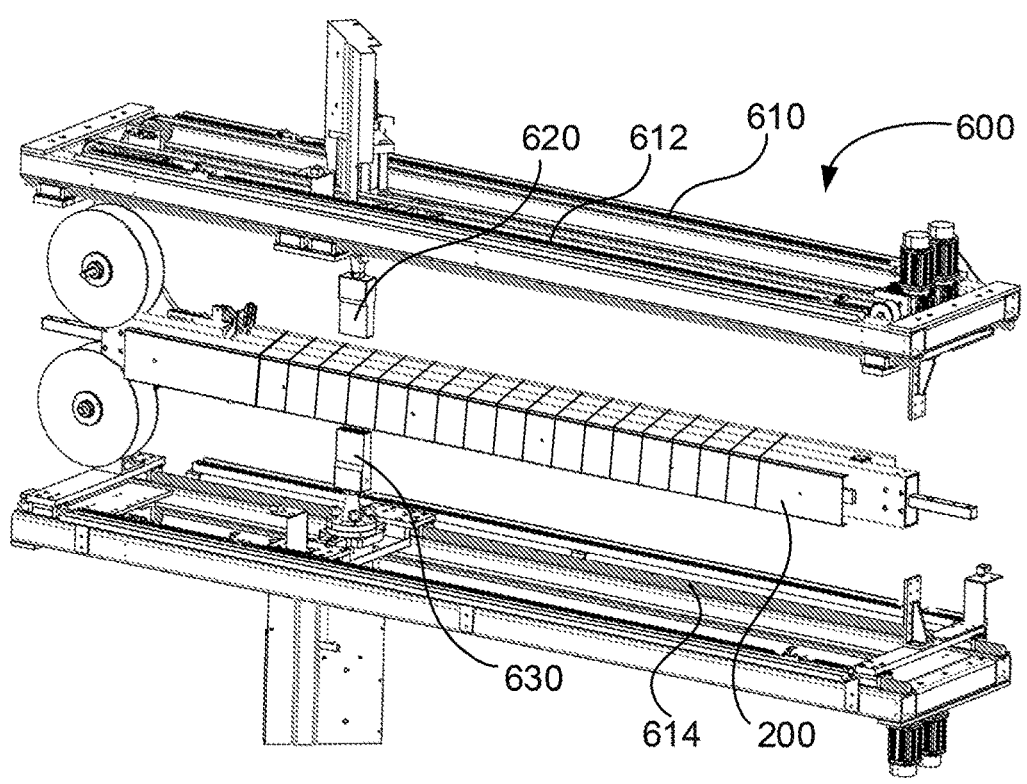
FIG. 15 is a schematic structure of an ultrasonic welding apparatus according to another example embodiment, in which a tensioning member carrier is arranged in the ultrasonic welding apparatus.
Figure 16:
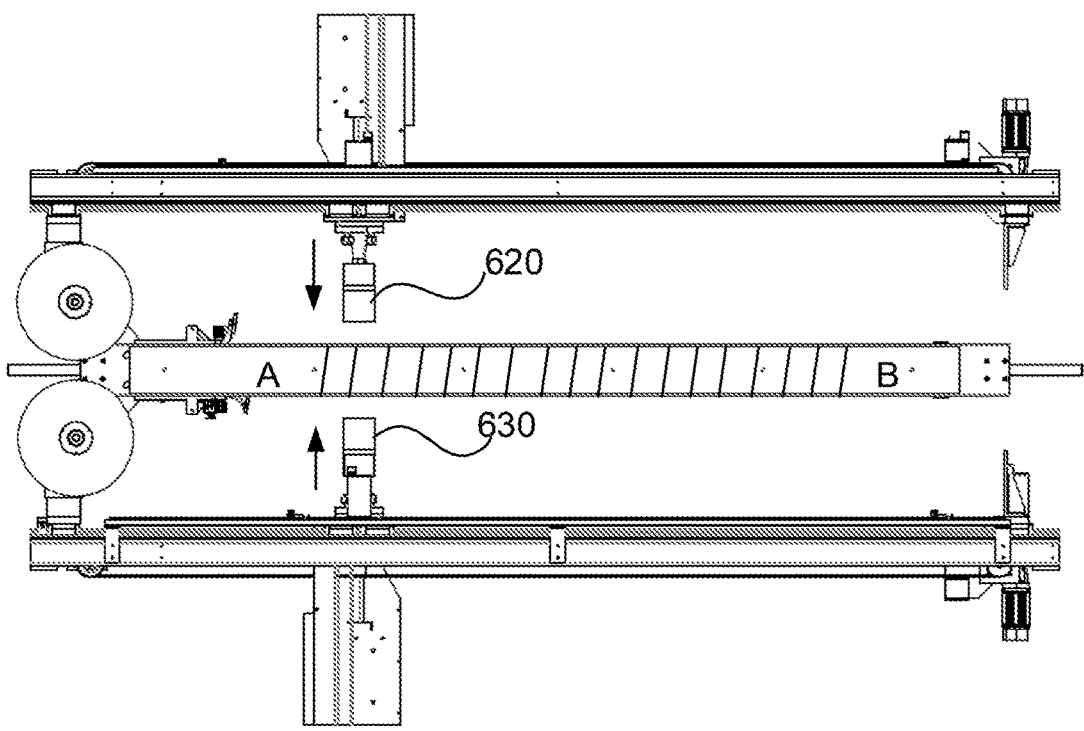
FIG. 16 is a front view of the ultrasonic welding apparatus shown in FIG. 15.

FIGS. 15 and 16 show a manufacturing apparatus and method according to a second example embodiment. It can be understood that these apparatuses and methods are similarly applicable to other example embodiments. Another welding process, which may, optionally, be an ultrasonic welding process is added in this example embodiment. The ultrasonic welding apparatus 600 includes a welding rack 610. The welding rack 610 is provided with a sliding track 612 on an upper surface, and is provided with a sliding track 614 on a lower surface. The sliding track 612 is provided with an upper welding head 620; and the sliding track 614 is provided with a lower welding head 630.

For this example embodiment, a winding process and an apparatus of a first step are the same as those in FIGS. 11*a*, 11*b* and 11*c*. Referring to FIG. 12, the winding apparatus 400 completes the winding of the thread around the tensioning member carrier 200. The flywheel 430 is rotated such that the gap 434 is horizontally aligned or substantially horizontally aligned with the center of the flywheel 430. The tensioning member carrier 200 moves out from the winding apparatus 400 by means of the tracks 300 through the gap 434.

Compared with the first embodiment, an ultrasonic welding process is added in the second embodiment. Referring to FIGS. 15 and 16, the tensioning member carrier 200 is placed between, the upper welding head 620 and the lower welding head 630 by means of the tracks 300. The tensioning member carrier 200 may be placed in middle positions of the upper and lower welding heads 620, 630, or in another position, as would be understood by one of skill in the art. The upper welding head 620 and the lower welding head 630 respectively move from a left end portion A of the thread 122 toward the tensioning member carrier 200 to be in contact with the thread 122, and weld, e.g., ultrasonically weld, a left end portion A of the thread 122, e.g. 2-20 mm, or 5-10 mm of an end part of a thread 122, to a fixing strip 124 or 126. The very end of the thread 122 may not be fixed to a fixing strip 124 or 126 and only an end portion A of an end of a thread 122 may be welded to a respective fixing strip 124 or 126. Thus, the end portion A of a thread 122 is spaced apart from the very end of a thread by a certain distance. The end portion A of the thread 122 may not comprise the end of the thread 122. An end portion A of a first and/or last winding of a thread 122 being in contact with a fixing strip 124 or 126 may be welded to the fixing strip 124 and/or 126. The first or last part of a winding not in contact with a fixing strip 124 or 126 may not be fixed to the respective strip. The length of the end portion A fixed to a fixing strip 124 or 126 may be between 5-25%, or about 10-20% of the width of the respective fixing strip 124 or 126. Optionally, the upper welding head 620 and the lower welding head 630 move away from the tensioning member carrier 200, and move to a right end portion B of the thread 122 by means of the sliding tracks 612 and 614, and similarly, weld the right end portion B of the thread 122, e.g. 2-20 mm, or 5-10 mm of an end portion B of the thread 122, to the fixing strips 124 and 126. The thread 122 is preliminarily fixed on the fixing strips 124 and 126, thus preventing the thread end of the thread 122 from being detached during subsequent movement. It is sufficient if only one end of the thread is fixed to the fixing strips. An increased structural integrity of the tensioning member can be gained by fixing both ends of each thread 122.

A subsequent high-frequency welding process may be the same as that in FIGS. 13 and 14. The tensioning member carrier 200 wound with the thread 122 is placed at the position for welding of the high-frequency welding apparatus 500. The two welding plates 520 respectively move toward the tensioning member carrier 200 to respectively weld the fixing strips 124 and 126 to the sheet materials of the top wall 140 and the bottom wall 160. The distances of the front adjustment plate 260 and the rear adjustment plate 280 relative to the base plate 220 are reduced, e.g. by adjusting an oil pressure through oil holes, and the tensioning member carrier 200 is pulled out. At this point, the welding process, the high-frequency welding process of one internal tensioning member 120 may be completed.

In the second example embodiment, the thread 122 and the fixing strips 124 and 126 are preliminarily fixed in the manufacturing process, which is conducive to the implementation of other possible complex processes prior to the welding, e.g., the high-frequency welding process. It can be understood that the upper welding head 620 or the lower welding head 630 may optionally be omitted in other example embodiments such that the thread 122 is preliminarily fixed to one of the fixing strips 126 and 124. Experiments have shown that the fixation to only one single strip is sufficient to form a tensioning member.

Figure 17:
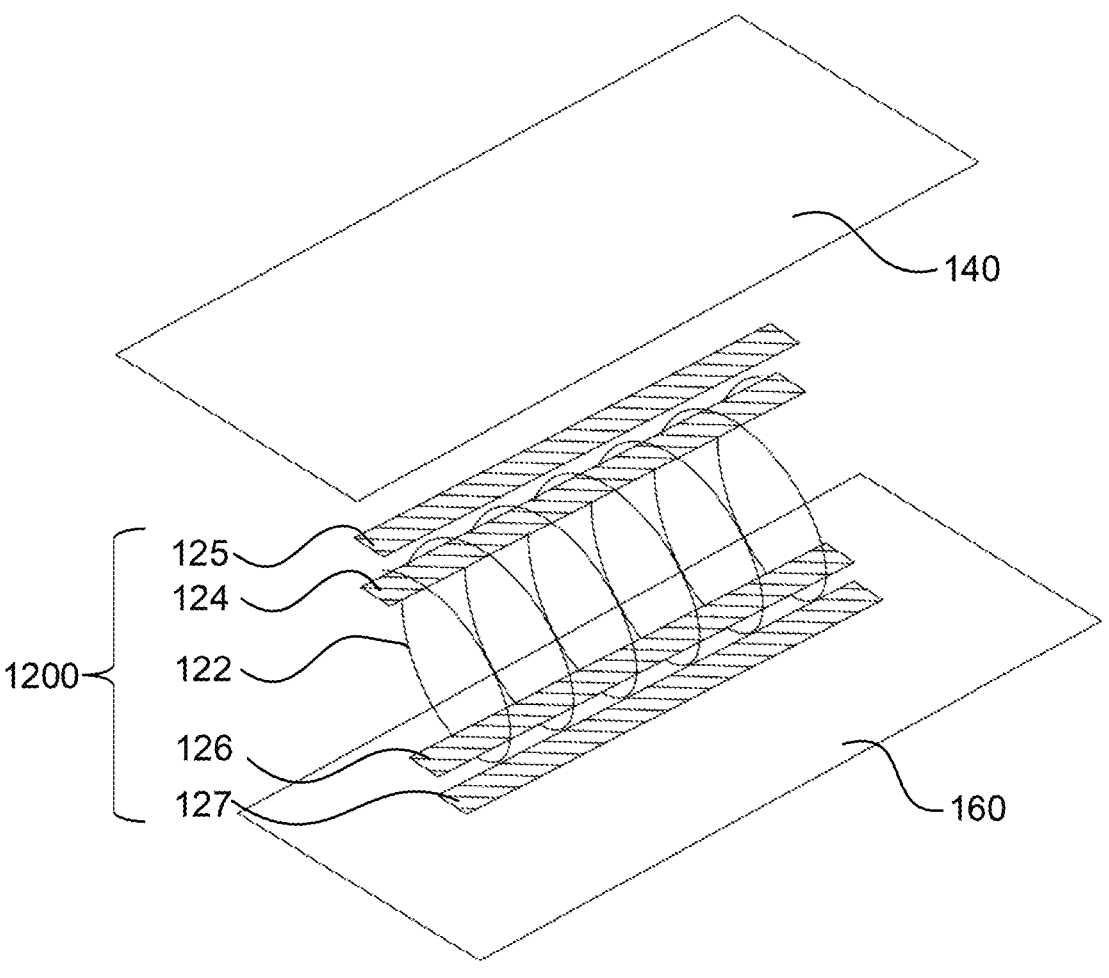
FIG. 17 is a schematic structure of another internal tensioning member of an inflatable product according to an example embodiment.

FIG. 17 shows another structural relationship between the tensioning member 1200 and the top wall 140 and the bottom wall 160 according to a third example embodiment. A single thread 122 is wound in a spiral manner around the fixing strip 124 and the fixing strip 126. The fixing strip 124 and the fixing strip 125 sandwich one end portion of the helix thread 122, and the fixing strip 126 and the fixing strip 127 sandwich the other end portion of the helix thread 122. The fixing strip 124, the fixing strip 125 and the top wall 140 are welded; and the fixing strip 126, the fixing strip 127 and the bottom wall 160 are welded. Similarly, the fixing strips 124, 125, 126, 127, the top wall 140 and the bottom wall 160 may be made from one or more of the following weldable materials: PVC, TPU, PET, EVA, polyurethane or nylon, or any other elastic material suitable for manufacturing inflatable products. Optionally, one or more of the fixing strips 124, 125, 126 and 127, the top wall 140 and bottom wall 160 may further optionally have an attachment layer or interlayer capable of enhancing the tensile resistance property thereof, and the attachment layer or interlayer may include, for example, threads, fibers, or a mesh structure. The thread 122 is made of a windable tensile-resistant material, such as cotton fibers, linen fibers, silk fibers, nylon fibers, natural fibers, synthetic fibers, polyester, polypropylene, polyethylene, glass fibers, carbon fibers, etc. It can be understood that although the tensioning member 120 in the illustrated example embodiment is constructed on the basis of a single thread 122, in other example embodiments, the tensioning member 120 may alternatively be constructed on the basis of a plurality of threads 122 while the plurality of threads 122 are wound around the fixing strips 124 and 126 in a mutually spaced manner. The fixing strips and the top wall and the bottom wall may be glued, welded or fixedly connected by any other reliable means.

In this example embodiment, two fixing strips of the tensioning member 1200 are used to fix the end portions of the helix thread so that three layers of PVC materials (e.g., the fixing strip 124, the fixing strip 125, and the top wall 140) are welded together, which increases the overall thickness of the welded materials while the thread 122 is further secured in production, thereby increasing product reliability.

It can be understood that one of the fixing strips 125 and 127 may optionally be omitted in other example embodiments.

Figure 18:
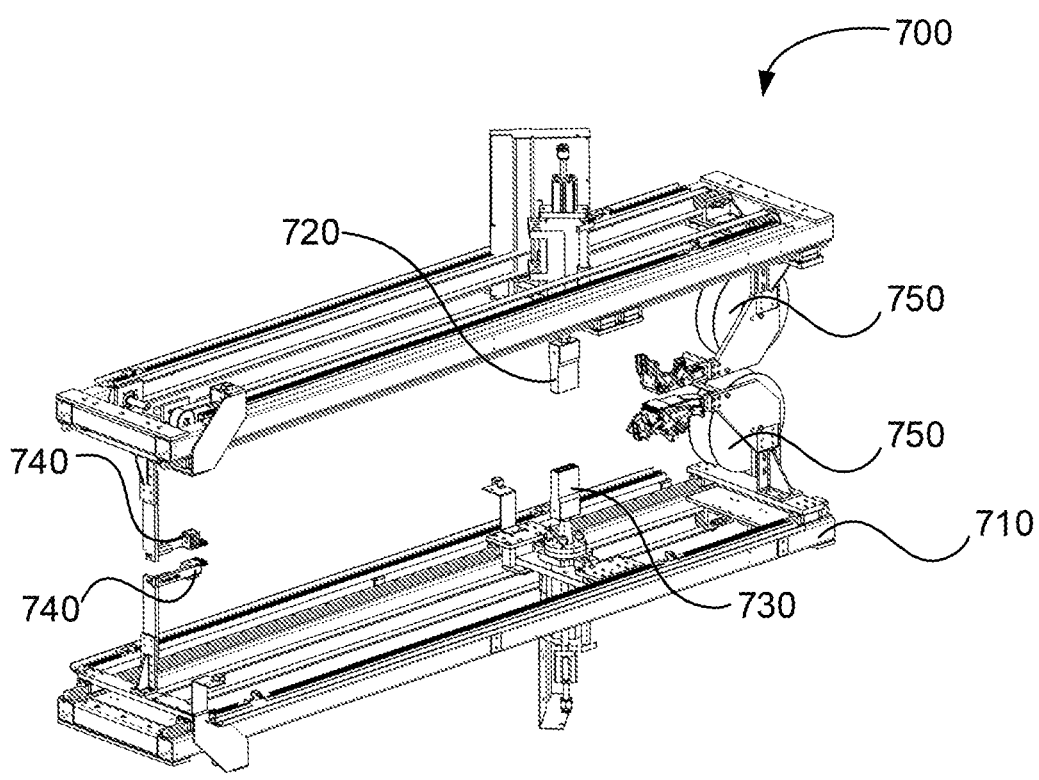
FIG. 18 is a schematic structure of an ultrasonic welding apparatus according to another example embodiment.

FIG. 18 shows a manufacturing apparatus and method for a tensioning member 1200 according to a third example embodiment. It can be understood that these apparatuses and methods are similarly applicable to other example embodiments. An ultrasonic welding apparatus 700 includes a welding rack 710, where the welding rack 710 is provided with sliding tracks on upper and lower surfaces respectively. The two sliding tracks are respectively provided with an upper welding head 720 and a lower welding head 730. The ultrasonic welding apparatus 700 is provided with two fixing strip rolls 750 at one end portion and two fixing strip grippers 740 at the other end portion. The fixing strip grippers 740 can move to the two fixing strip rolls 750 to grip the fixing strips 125 and 127, and return to initial positions to place the fixing strips 125 and 127 on the upper and lower surfaces of the tensioning member carrier 200.

For this example embodiment, the winding process and the apparatus of the first step may be the same as those in FIGS. 11a, 11b and 11c. Referring to FIG. 12, the tensioning member carrier 200 completes the winding of the thread around the winding apparatus 400. The flywheel 430 is rotated such that the gap 434 is horizontally aligned or substantially aligned with the center of the flywheel 430. The tensioning member carrier 200 moves out from the winding apparatus 400 by means of the tracks 300 through the gap 434. Thus, the winding process is completed.

Figure 19:
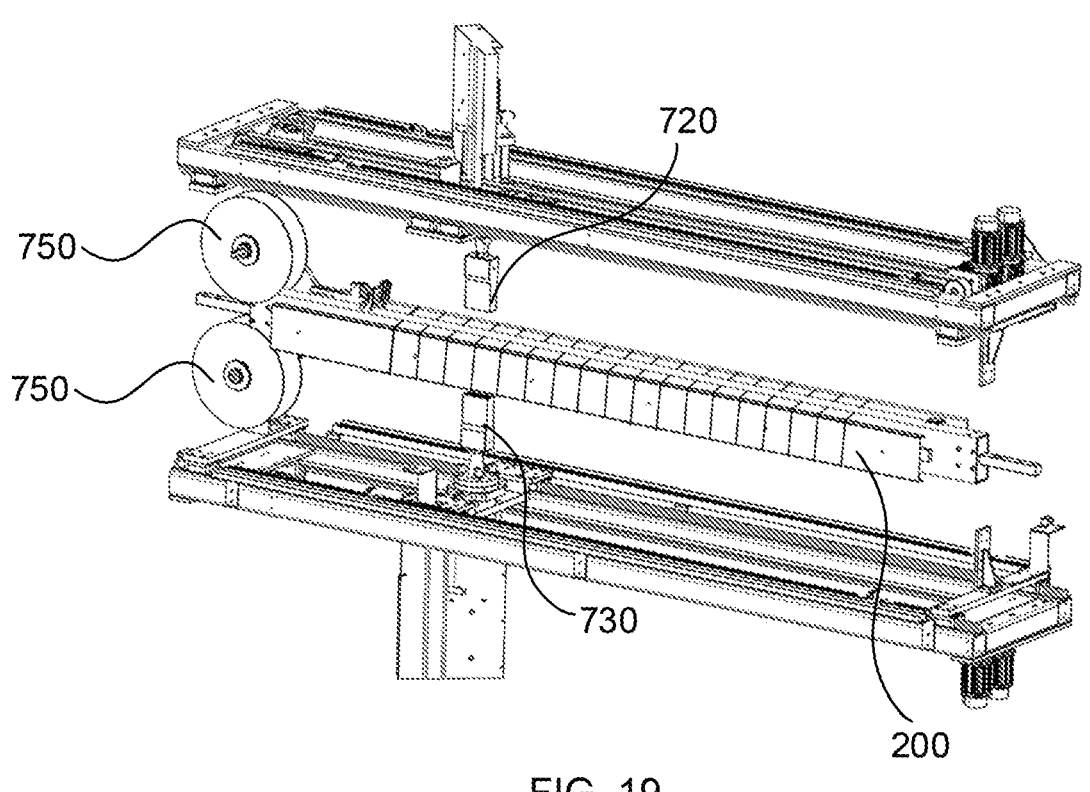
FIG. 19 is a schematic perspective view of the ultrasonic welding apparatus shown in FIG. 18, in which the tensioning member carrier shown in FIG. 17 is arranged in the ultrasonic welding apparatus.

FIG. 19 shows an ultrasonic welding process of a second step, with the tensioning member carrier 200 being placed between the upper welding head 720 and the lower welding head 730 of the ultrasonic welding apparatus 700 by means of the tracks 300. The fixing strip grippers 740 (not shown in this figure) move in a radial direction to the two fixing strip rolls 750 to grip the fixing strips 125 and 127, and return to the initial positions to place the fixing strips 125 and 127 on the upper and lower surfaces of the tensioning member carrier 200.

The upper welding head 720 and the lower welding head 730 move toward the tensioning member carrier 200 respectively at one end portion position of the fixing strips to be in contact with the fixing strips 125 and 127, and ultrasonically weld the fixing strips 124 and 125 and the fixing strips 126 and 127 respectively at the end portion of the tensioning member 1200 in a preliminary manner. Subsequently, the upper welding head 720 and the lower welding head 730 move away from the tensioning member carrier 200 to the other end position of the tensioning member 1200 by means of the sliding tracks, and similarly, weld the fixing strips 124 and 125 and the fixing strips 126 and 127 in a preliminary manner. In this way, the helix thread 122 is preliminarily fixed between the two groups of fixing strips, thus preventing the thread end of the thread 122 from being detached during subsequent movement.

Optionally, the upper welding head 720 and the lower welding head 730 may weld middle positions of the fixing strips 124 and 125 and the fixing strips 126 and 127 to ensure that the thread 122 is fixed between the two fixing strips 124 and 125 and between the two fixing strips 126 and 127, preventing the thread end of the thread 122 from being detached during subsequent movement.

Figure 20:
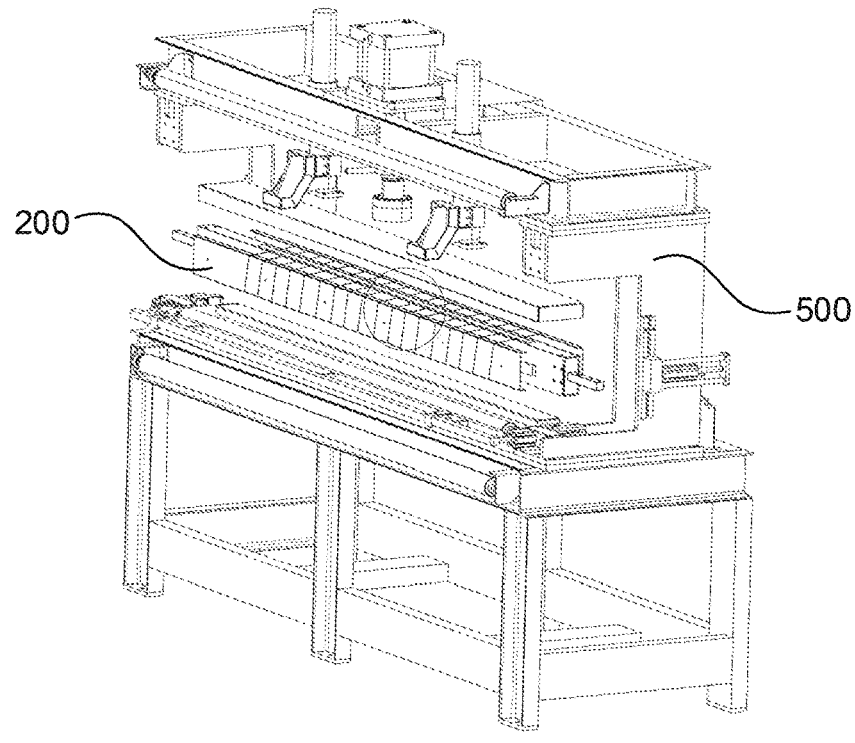
FIG. 20 is a method of welding another internal tensioning members shown in FIG. 17 in a high-frequency welding apparatus according to an example embodiment.
Figure 21:
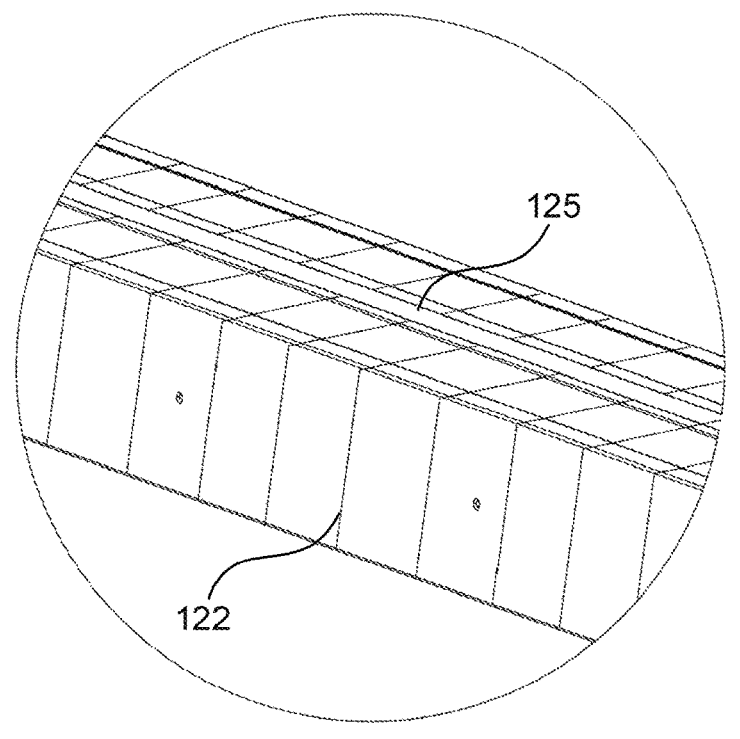
FIG. 21 is a partial enlarged view of the high-frequency welding apparatus shown in FIG. 20.

The subsequent high-frequency welding process may be the same as that in FIGS. 13 and 14. Referring to FIGS. 20 and 21, the tensioning member carrier 200 wound with the thread 122 and provided with the fixing strips 125 and 127, is arranged at a position for welding of the high-frequency welding apparatus 500. The two welding plates 520 respectively move toward the tensioning member carrier 200 to weld the fixing strips 124 and 125 to the sheet material of the top wall 140, and to weld the fixing strips 126 and 127 to the sheet material of the bottom wall 160. Subsequently, the oil pressure is adjusted through the oil holes, the distances of the front adjustment plate 260 and the rear adjustment plate 280 relative to the base plate 220 are reduced, and the tensioning member carrier 200 is pulled out. At this point, the high-frequency welding process of one internal tensioning member 1200 is completed.

It can be readily understood that the welded internal tensioning members 1200 are continuously obtained on the sheet materials of the top wall 140 and the bottom wall 160, and after a predetermined number of internal tensioning members 1200 required for the inflatable mattress is reached, a worker cuts the processed sheet materials according to a predetermined size in a subsequent process and then welds them to a sheet material of the side wall 180 to form a complete inflatable mattress.

Figure 22:
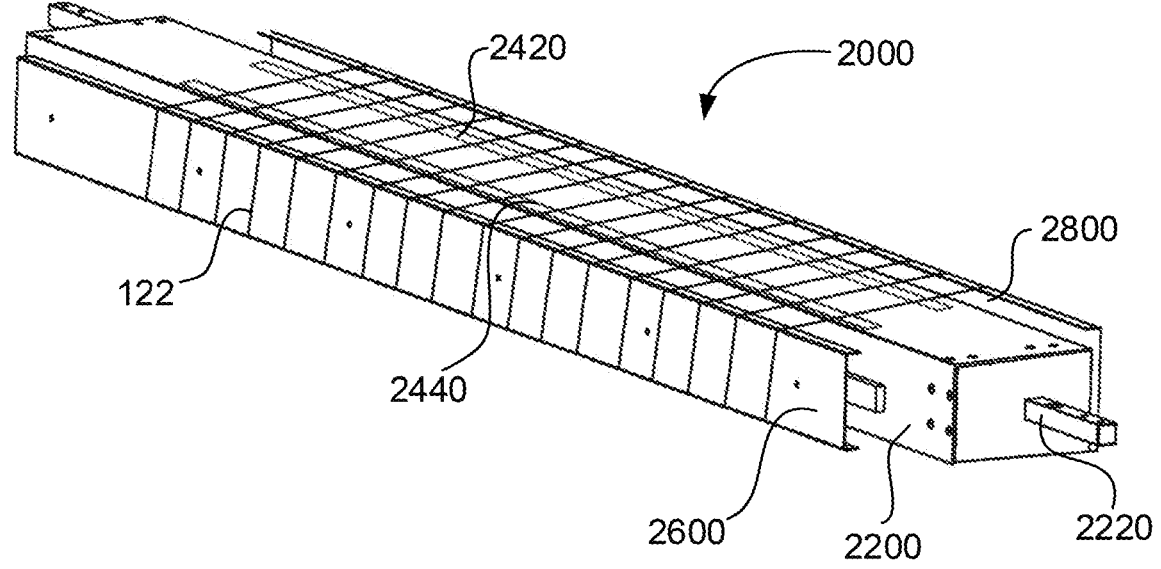
FIG. 22 is a perspective structure of a tensioning member carrier according to another example embodiment.

FIG. 22 shows an example structure of a tensioning member carrier 2000 according to a fourth example embodiment. The tensioning member carrier 2000 is similarly used to carry a component or assembly bearing the tensioning member 120 to apparatus rooms for processing. In this example embodiment, the tensioning member carrier 2000 includes a structure that is highly similar to the tensioning member carrier 200 shown in FIG. 5. The base plate 2200 is a cuboid, including an upper surface and a lower surface that are smooth. In this example embodiment, the base plate 2200 is made of an aluminum material. Two parallel welding plates (not shown) are fixedly arranged on the upper surface of the base plate 2200. In this example embodiment, the two parallel welding plates are made of a copper material. Fixing strips 2420 and 2440 are similarly fixed to the tensioning member carrier 2000 by winding the thread 122. The lower surface of the base plate 2200 is symmetrically arranged. It can be understood that the welding plate may alternately be made of aluminum or any of a variety of other materials used for high-frequency welding.

The front surface and the rear surface of the base plate 2200 are similarly provided with distance adjustment devices (not shown) respectively. In this example embodiment, the distance adjustment devices are respectively connected to a front adjustment plate 2600 and a rear adjustment plate 2800. Support rods 2220 are respectively arranged on the left and right surfaces of the base plate 2200. Oil holes are similarly formed in the support rods 2220. By pressurizing or depressurizing hydraulic oil through the oil holes, the length of the thread 122 is adjusted after tensioning.

In this example embodiment, the base plate 2200 differs from the tensioning member carrier 200 shown in FIG. 5 in that the upper and lower surfaces of the base plate 2200 are widened and are each provided with two welding plates. The distance between the two welding plates on the same surface shall be the distance between the two internal tensioning members 120 inside the inflatable mattress product.

For the manufacturing process of the fourth example embodiment, the winding process and the apparatus of the first step may be substantially the same as those in FIGS. 11a, 11b and 11c. Compared with FIGS. 8 and 9, the winding apparatus in this example embodiment requires two pairs of fixing strip rolls 450 at one end portion and two pairs of fixing strip grippers 440 at the other end portion. In this way, they correspond to two pairs of welding plates on the upper and lower surfaces of the base plate 2200.

Similar to the winding process in the first example embodiment, the flywheel 430 is rotated such that the gap 434 is horizontally aligned or substantially aligned with the center of the flywheel 430. The tensioning member carrier 2000 moves into the central position of the flywheel 430 by means of the tracks 300 through the gap 434, and is perpendicular to the flywheel 430. The two pairs of fixing strip grippers move to the positions of the two pairs of fixing strip rolls, and grip four fixing strips and move to the other end, so that the fixing strips 2420 and 2440 are respectively placed at two welding plates on the upper surface of the base plate 2200, while the other two fixing strips (not shown) are respectively placed at two welding plates on the lower surface of the base plate 2200. The tensioning member carrier 2000 completes the winding of the thread on the winding apparatus (see FIGS. 11a, 11b and 11c), and moves out from the winding apparatus through the gap in the flywheel. The tensioning member carrier 2000 wound with the thread 122 is arranged at a position for welding of the high-frequency welding apparatus.

Figure 23:
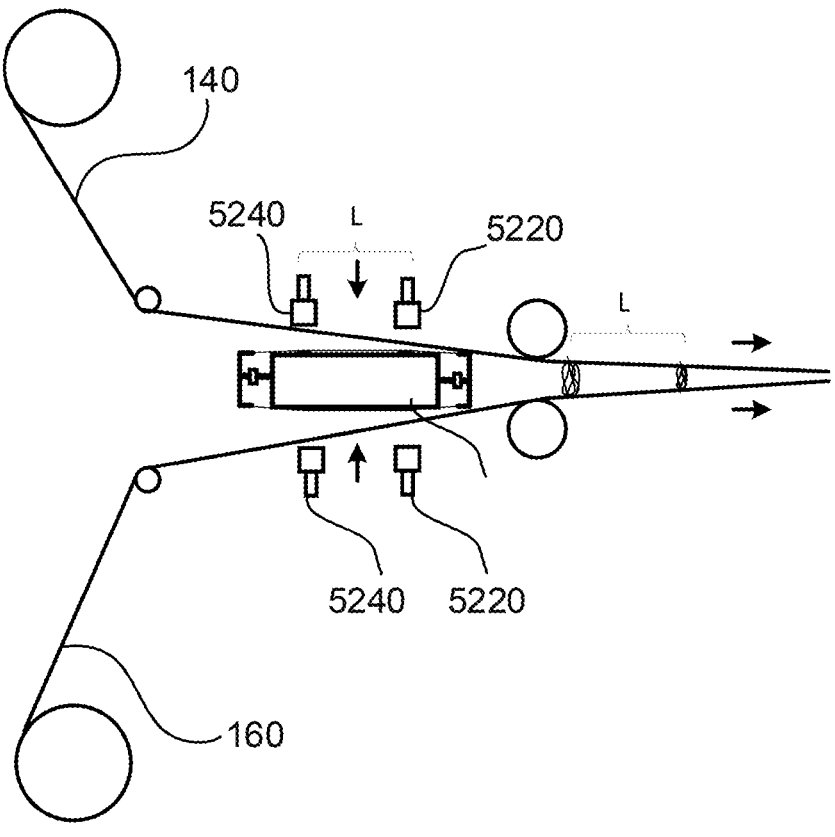
FIG. 23 is a schematic diagram showing an operating principle of the tensioning member carrier shown in FIG. 22.

Referring to FIG. 23, in this example embodiment, two welding plates 5220 and 5240 may be arranged above and below the high-frequency welding apparatus, respectively. Similarly, the distance between the welding plates 5220 and 5240 on the same side of the high-frequency welding apparatus may be equal to the distance between the two fixing strips 2420 and 2440 on one surface of the tensioning member carrier 2000. In this way, the two pairs of welding plates 5220 and 5240 of the high-frequency welding apparatus, respectively, move toward the tensioning member carrier 2000, and after the welding process is completed, the two pairs of fixing strips 2420 and 2440 are both welded to the sheet materials of the top wall 140 and the bottom wall 160. It can be readily understood that the distance between the two fixing strips 2420 and 2440 on the same surface may be the distance between the two internal tensioning members 120 within the inflatable mattress product.

At this point, yet another example embodiment is described. After one working cycle of the tensioning member carrier 2000, the top wall 140 and the bottom wall 160 of the inflatable mattress actually complete the manufacture of two internal tensioning members 120, so that the production efficiency of manufacturing the internal tensioning members 120 and welding them to the top wall 140 and the bottom wall 160 is almost doubled.

Those skilled in the art would have readily understood that the fourth example embodiment may comprise any combination of the features of the previous three example embodiments. For example, in one example embodiment, the fourth example embodiment may be preliminarily fixed using the ultrasonic welding process shown in FIG. 15. In another example embodiment, the two pairs of fixing strips 2420 and 2440 used in the fourth example embodiment may be configured such that the threads 122 are respectively arranged among the two pairs of fixing strips by the ultrasonic welding apparatus 700 shown in FIG. 18, and in this case, only the numbers and positions of the fixing strip grippers and the fixing strip rolls of the ultrasonic welding apparatus 700 need to be adjusted accordingly.

One or more of the above-described example embodiments may reduce the consumption of non-degradable materials, and improve the production efficiency, quality and stability of products.

Figure 24:
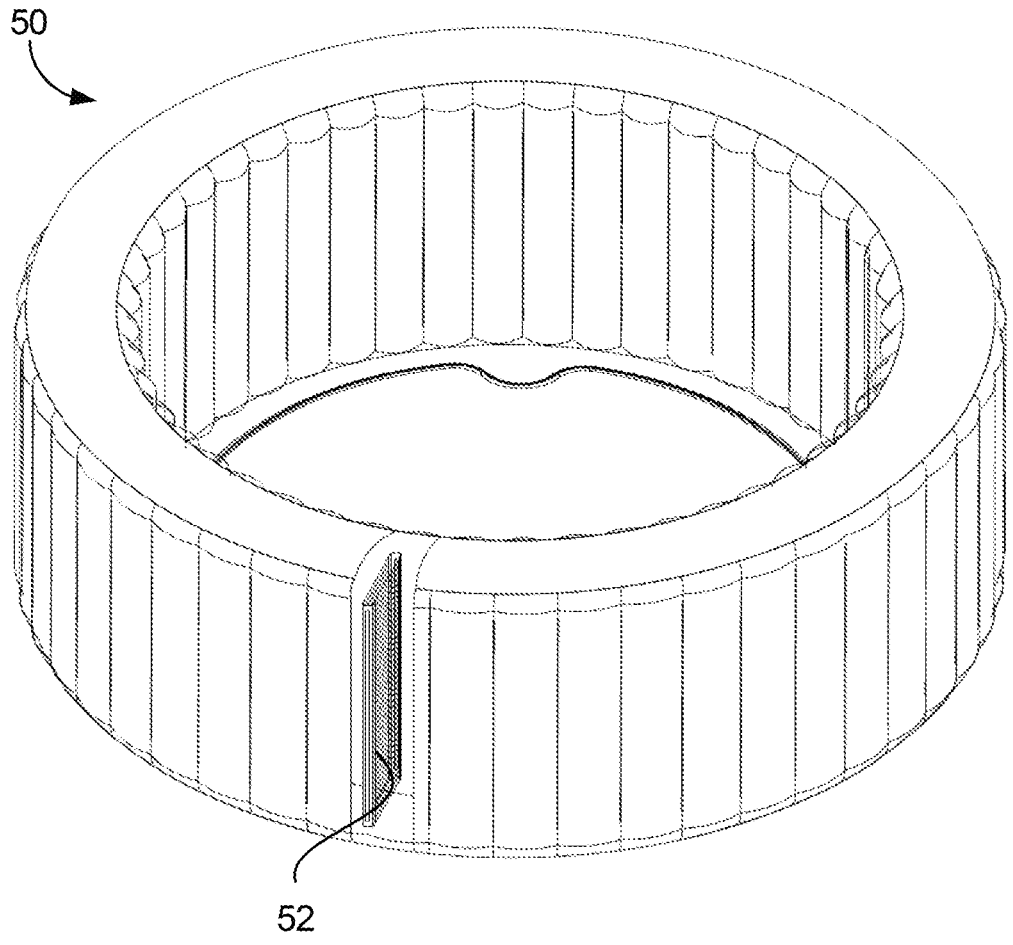
FIG. 24 is a schematic structural diagram of an inflatable massage bathtub according to an example embodiment.

Those skilled in the art would have readily understood that the above-described example embodiments can be applied to almost all inflatable products. For example, as shown in FIG. 24, in an optional example embodiment, the inflatable product may be an inflatable massage bathtub. The inflatable massage bathtub 50 includes an outer wall and an inner wall that are spaced apart from each other, and further includes a plurality of internal tensioning members 52. Each internal tensioning member 52 is connected to the inner wall and the outer wall.

Figure 25:
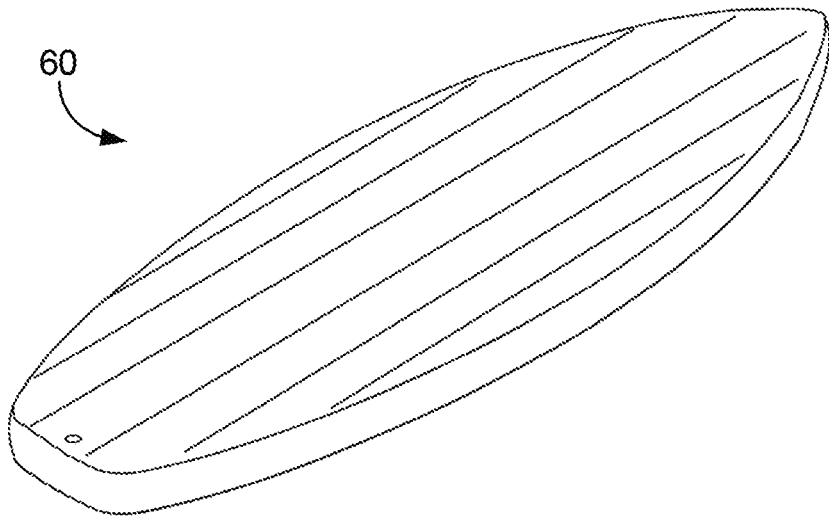
FIG. 25 is a schematic structural diagram of an inflatable surfboard according to an example embodiment.
Figure 26:
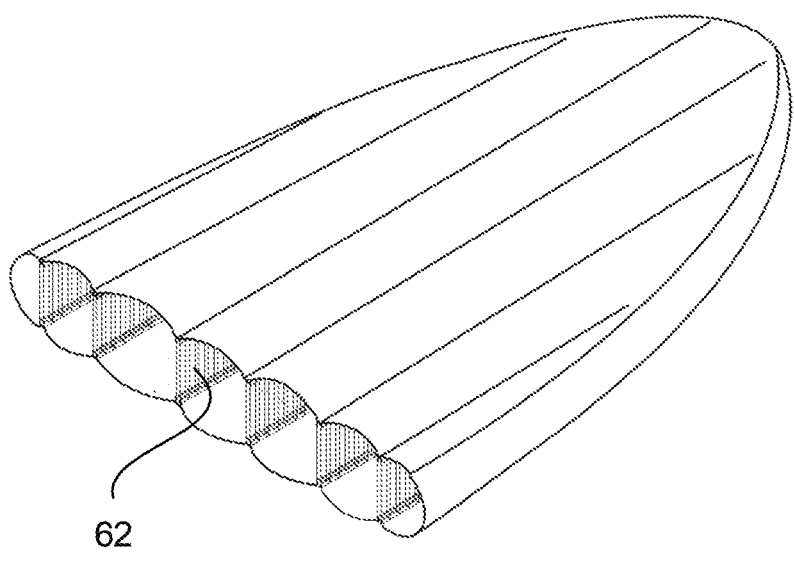
FIG. 26 is a schematic cross-sectional view of the inflatable surfboard shown in FIG. 25.

In an example embodiment, the inflatable product may also be an inflatable surfboard. FIGS. 25 and 26 illustratively show a perspective view and a cross-sectional view of an inflatable surfboard 60 according to an example embodiment. The inflatable surfboard 60 includes a top wall and a bottom wall that are spaced apart from each other, and further includes a plurality of internal tensioning members 62. Each internal tensioning member 62 is connected to the top wall and the bottom wall. For single-chamber or double-chamber surfboards of different sizes and different bearing capacities, internal tensioning members may be arranged at different intervals.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An inflatable product, comprising:
   a first wall,
   a second wall opposite the first wall, and
   a plurality of internal tensioning members connecting the first wall and the second wall, each of the internal tensioning members comprising:
   a first fixing strip fixedly and directly coupled to the first wall;
   a second fixing strip fixedly and directly coupled to the second wall, the second fixing strip disposed in parallel to the first fixing strip;
   at least one thread extending helically around and along the first fixing strip and the second fixing strip,
   wherein first parts of the at least one thread are fixed between the first fixing strip and the first wall, and second parts of the at least one thread are fixed between the second fixing strip and the second wall.

2. The inflatable product of claim 1, wherein the at least one thread comprises a plurality of threads spaced apart from each other along a length of the first fixing strip and the second fixing strip.

3. The inflatable product of claim 2, wherein the plurality of threads are spaced apart from each other at a constant interval along the length of the first fixing strip and the second fixing strip.

4. The inflatable product according to claim 1, wherein each of the first fixing strip, the second fixing strip, the first wall, and the second wall are made from a weldable material.

5. The inflatable product according to claim 1, wherein each of the first fixing strip, the second fixing strip, the first wall, and the second wall are made from one of: polyvinyl chloride, thermoplastic polyurethane elastomer, polyethylene terephthalate, ethylene-vinyl acetate, polyurethane, and nylon.

6. The inflatable product according to claim 1, wherein the at least one thread is made from one of: cotton fibers, linen fibers, silk fibers, nylon fibers, natural fibers, synthetic fibers, polyester, polypropylene, polyethylene, glass fibers, and carbon fibers.

7. The inflatable product according to claim 1, wherein the first fixing strip is fixedly coupled to the first wall by means of high-frequency welding, and the second fixing strip is fixedly coupled to the second wall by means of high-frequency welding.

8. The inflatable product according to claim 1, wherein at least one end portion of the at least one thread is welded to one of the first fixing strip and second fixing strip.

9. The inflatable product according to claim 8, wherein from 3-20 mm of the end portion of the at least one thread is welded to the one of the first fixing strip and the second fixing strip.

10. The inflatable product according to claim 1, wherein:

the first fixing strip comprises a plurality of first fixing strips spaced apart from each other and arranged in parallel to and along the first wall, such that each of the plurality of first fixing strips is fixedly and directly coupled to the first wall, and wherein the at least one thread is helically wound around and along the plurality of first fixing strips.

11. The inflatable product according to claim 10, wherein:

the second fixing strip comprises a plurality of second fixing strips spaced apart from each other and arranged in parallel to and along the second wall, such that each of the plurality of second fixing strips is fixedly and directly coupled to the second wall, and wherein the at least one thread is helically would around and along the plurality of first fixing strips and the plurality of second fixing strips.

\* \* \* \* \*